(12) United States Patent
Yousefi'zadeh

(10) Patent No.: US 6,950,848 B1
(45) Date of Patent: Sep. 27, 2005

(54) DATABASE LOAD BALANCING FOR MULTI-TIER COMPUTER SYSTEMS

(76) Inventor: Homayoun Yousefi'zadeh, 14 Posada, Irvine, CA (US) 92614

(*) Notice: Subject to any disclaimer, the term of this patent is extended or adjusted under 35 U.S.C. 154(b) by 0 days.

(21) Appl. No.: 09/565,777

(22) Filed: May 5, 2000

(51) Int. Cl.[7] ............................................. G06F 15/16
(52) U.S. Cl. ..................... 709/203; 709/217; 709/226; 718/105; 707/10
(58) Field of Search ................. 709/226, 203, 709/223–224, 105, 241, 201, 217–219; 707/10; 718/105

(56) References Cited

U.S. PATENT DOCUMENTS

| | | | | |
|---|---|---|---|---|
| 5,754,772 A | * | 5/1998 | Leaf ........................... | 709/203 |
| 6,085,198 A | * | 7/2000 | Skinner et al. .......... | 707/103 R |
| 6,125,363 A | * | 9/2000 | Buzzeo et al. .............. | 707/100 |
| 6,134,594 A | * | 10/2000 | Helland et al. ............. | 709/203 |
| 6,175,869 B1 | * | 1/2001 | Ahuja et al. ................ | 709/226 |
| 6,209,029 B1 | * | 3/2001 | Epstein et al. .............. | 709/219 |
| 6,266,666 B1 | * | 7/2001 | Ireland et al. ................ | 707/10 |
| 6,286,104 B1 | * | 9/2001 | Buhle et al. .................. | 707/10 |
| 6,446,109 B2 | * | 9/2002 | Gupta ........................ | 709/203 |

* cited by examiner

*Primary Examiner*—Philip B. Tran

(57) ABSTRACT

A load balancing method and system for a transaction computer system having multiple database servers for at least one database, wherein database servers cooperate to provide a unified view of the data in the database. The method includes the steps of establishing connections to said multiple database servers for communicating with said database servers; and assigning transactions to respective ones of said multiple database servers to balance respective loads of said multiple database servers. Assigning each new transaction includes the steps of determining possible assignments of that new transaction to one or more of said multiple database servers, each said possible assignment to one of said multiple database servers being based on a load balancing scheme to balance respective loads of said multiple database servers; and assigning that new transaction to one of said multiple database servers as a function of said possible assignments of that new transaction, to balance respective loads of said multiple database servers.

39 Claims, 16 Drawing Sheets

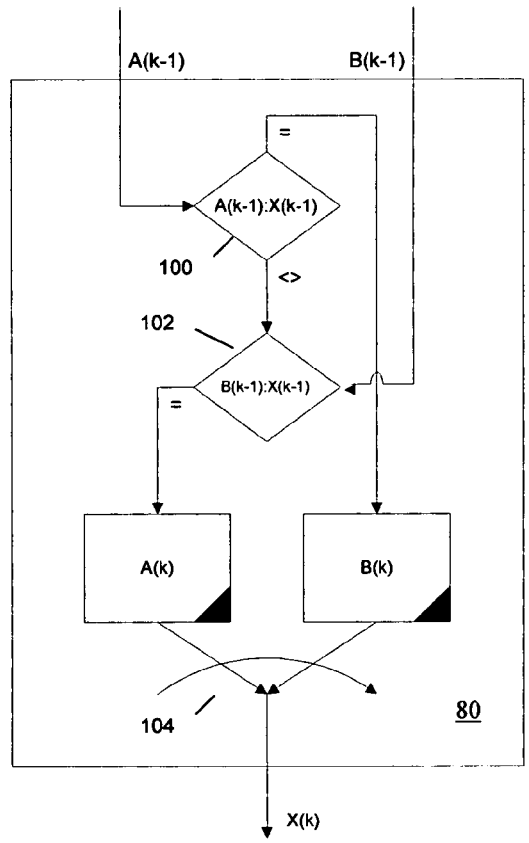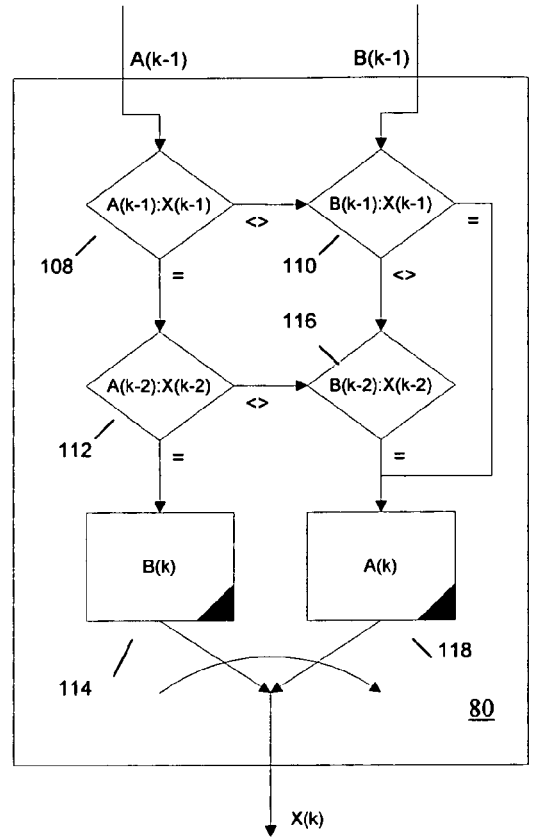
FIG. 5A
FIG. 5B

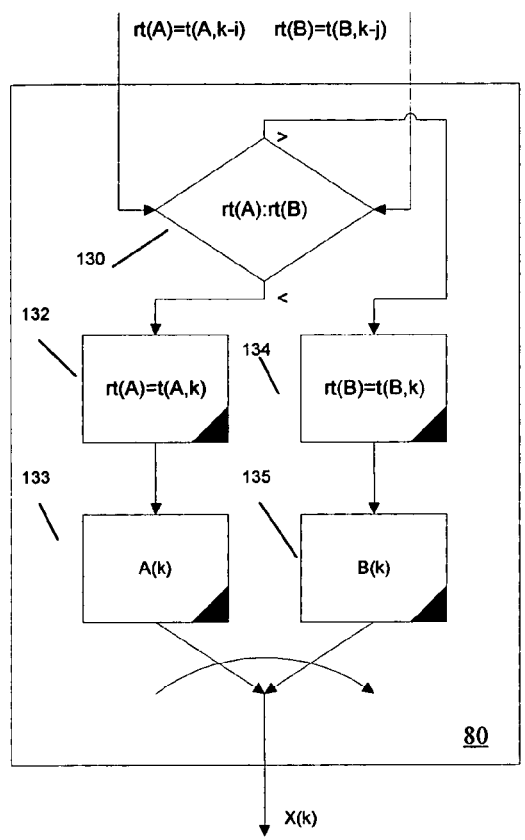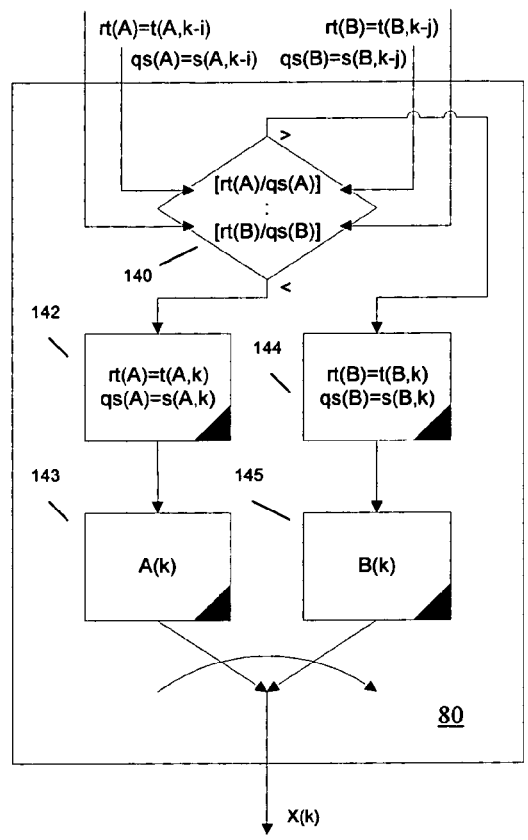
FIG. 7A
FIG. 7B

DATABASE LOAD BALANCING FOR MULTI-TIER COMPUTER SYSTEMS

FIELD OF THE INVENTION

The present invention relates generally to database systems, and in particular to load balancing for database systems.

BACKGROUND OF THE INVENTION

Database systems are utilized in many aspects of data processing systems, including in networked computer systems such as the Internet and the World Wide Web (WWW) which have grown to a robust infrastructure for handling mission-critical business traffic. As the result, commerce on the Internet is growing exponentially with the increasing number of Web sites (servers) and Internet users using client workstations (client). To support this growth, Web sites (implemented on Web and database servers) must be able to set up and maintain a few million connections every second. Further, quick response time and continuous availability are mandatory requirements as Web sites compete to offer users the best on-line experience.

Conventional networked computer infrastructure for businesses (e.g., over the Internet and WWW), utilizes a multi-tier client-server architecture. Client-server architecture provides multiple clients with access to the same data via servers. In its most basic form, a two-tier model is a client-server model in which a client communicates with a server across a network to request remote services. For example, a retail user can point a browser on a personal computer to Web site of an online bookstore to request information about a book title. The request in turn is routed to a centralized Web server through the network, and the Web server in turn communicates with a database engine/server to return the requested information to the retail user. The centralized server can communicate with a number of clients simultaneously.

In the two-tier architecture, one server is responsible for offering both Web and database contents. A two-tier architecture provides multiple clients with a uniform presentation layer that communicates with a centralized data storage layer. The presentation layer is generally the client and the data storage layer is the server. A disadvantage of the two-tier architecture is that it is not capable of adapting to changing environments and scaling with growing user and data volume and traffic. This is because each client carries the presentation logic and a part of business logic while the server carries the other part of business logic as well as the required resources such as the web and database servers.

The scalability and changing environment issues in a two-tier architecture have been addressed to a certain degree by extending the two tiers to three. A three-tier architecture isolates the data processing in a central location that can be easily changed without impacting the clients. In a three-tier architecture, the presentation logic resides in the first (client) tier, the business logic in the middle tier, and other resources such as database reside in the back-end third tier. The middle tier of a three-tier architecture (usually the application server) handles data processing and plays the role of the interface between the front-end tier (client) and the back-end tier (database).

The middle tier is the primary interface that directly interacts with the clients located in the first tier and hides all of the functional details of the back-end tier from the clients. In an example three-tier architecture, the middle tier comprises a Web server that interacts with the client web browsers, and the back-end tier comprises a database engine that interacts only with the Web server. However, a major disadvantage of such a system is that a relatively large number of clients in the first tier simultaneously requesting remote services can gradually create a bottleneck in the second and third tiers. This degrades system availability and performance.

To alleviate this problem, some there-tier architectures have created a multi-tier architecture that expands the middle tier layer into multi-layer architecture, wherein a single Web server is replaced with multiple Web servers to increase performance of the middle tier while keeping the functionality transparent from the first layer clients. Though the performance shortcomings of the middle layer tier are somewhat alleviated, the back-end database tier continues to suffer substantially from lack of load-balancing, lack of scalability and performance enhancements, thereby negatively impacting the availability and scalability of the entire multi-tier system.

There, is therefore, a need for an implementation-independent method for the back-end database tier that provides database load balancing. There is also a need for scalable computer system comprising networked client and server computers using load balancing that maximizes server efficiency, such as in database management servers. There is also a need for a method and system that can scale server capacity dynamically to match aggregate client demand while ensuring continuous service availability network computing systems.

BRIEF SUMMARY OF THE INVENTION

The present invention alleviates the shortcomings of conventional systems. In one embodiment, the present invention provides implementation independent database load balancing for a scalable computer system comprising networked client and server computers, to maximize server efficiency. Dynamic load balancing optimizes the resource utilization to reduce server response times, such as in database management systems.

In one aspect the present invention provides a load balancing method and system for a transaction computer system having multiple database servers for at least one database. The method includes the steps of establishing connections to said multiple database servers for communicating with said database servers, the database servers having a unified view of the data in the database; and assigning transactions to respective ones of said multiple database servers to balance respective loads of said multiple database servers. Assigning each new transaction includes the steps of determining possible assignments of that new transaction to one or more of said multiple database servers, each said possible assignment to one of said multiple database servers being based on a load balancing scheme to balance respective loads of said multiple database servers; and assigning that new transaction to one of said multiple database servers as a function of said possible assignments of that new transaction, to balance respective loads of said multiple database servers.

BRIEF DESCRIPTION OF THE DRAWINGS

These and other features, aspects and advantages of the present invention will become understood with reference to the following description, appended claims and accompanying figures where:

FIG. 5A shows an example flowchart of an embodiment of a Round Robin database load balancing scheme for the database load balancing module of FIG. 2;

FIG. 5B shows an example flowchart of an embodiment of a RATIO database load balancing scheme for the database load balancing module of FIG. 2;

FIG. 7A shows an example flowchart of an embodiment of a standard FRT database load balancing scheme for the database load balancing module of FIG. 2;

FIG. 7B shows an example flowchart of an embodiment of a normalized FRT database load balancing scheme for the database load balancing module of FIG. 2;

DETAILED DESCRIPTION OF THE INVENTION

Figure 1A:
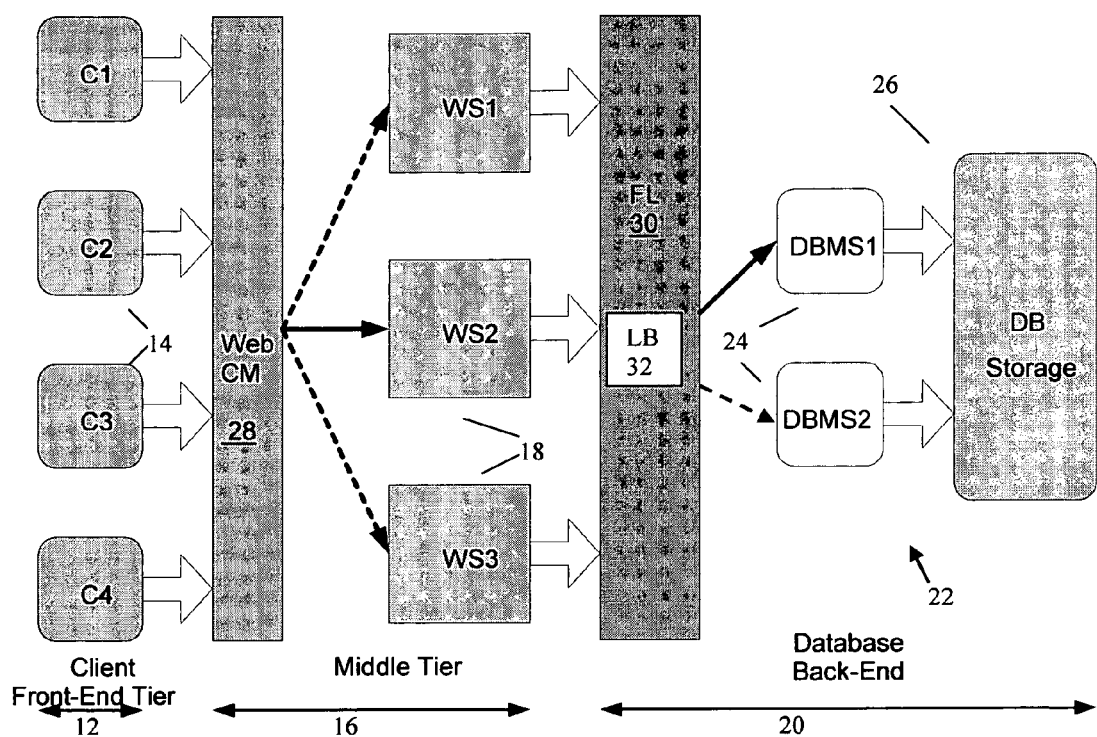
FIG. 1A shows an example block diagram of an embodiment of the architecture of a multi-tier computer system according to the present invention.

FIG. 1A shows an example architectural block diagram of an embodiment of a multi-tier network computer system 10 according to the present invention. The computer system comprises a three-tier architecture system including a front-end tier (first tier) 12 having multiple client workstations (clients) 14 (e.g., C1, C2, C3, C4), a middle-tier (second tier) 16 including servers 18 for data processing, and back-end tier (third tier) 20 including resources such a database system 22. The middle tier 16 (e.g., application server) provides data processing and interface between the front-end tier 12 (client) and the back-end tier 20. The middle tier 16 comprises the primary interface interacting with the clients 14 located in the first tier 12, and hiding all of the functional details of the back-end tier 20 from the clients 14.

In the example three-tier architecture 10, each server 18 in the middle tier 16 comprises a Web server (e.g., WS1, WS2, WS3) that interact with Web browsers running on clients 14. The database system 22 in the back-end tier 20 comprises multiple database management servers (e.g., DBMS1, DBMS2) 24 and on or more databases 26 (e.g., data repositories), wherein the database system 22 interacts with the Web servers 18. The middle tier 16 can further include a control module (CM) 28 for the web servers 18, wherein the clients 14 using browsers communicate with the control module 28 which forwards each client's request/transaction to an appropriate web server 18. The control module 28 is functionality transparent to the clients 14, and as far as the clients 14 are concerned the control module 28 is a web server itself. Each of the web servers 18, communicates with the database system 22 to e.g. send a transaction such as a query from a client 14 to the database system 22, receive a result back from the database system 22, and forward the results back to the client 14. By example, a database server/engine (DBMS) 14 can comprise software running on a computer to enable a user to create, maintain, and manage electronic databases. A database server acts as a broker between the physical database 26 storing data and the users (e.g., clients 14) of the database 26.

Figure 1B:
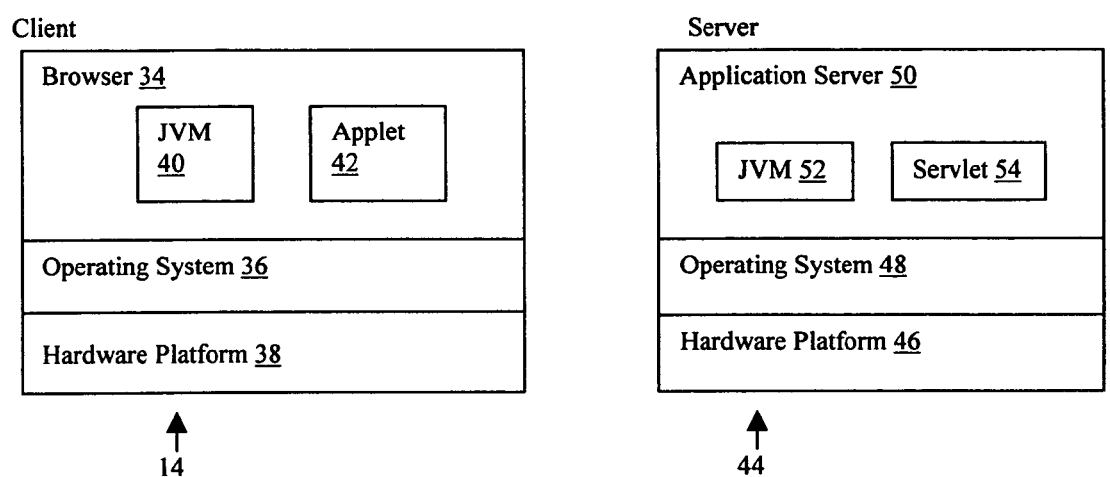
FIG. 1B shows example functional block diagrams of embodiments of a first tier client, and second and third tier servers in FIG. 1A.

As shown in FIG. 1B, in one embodiment, a front-end tier client 14 comprises a browser 34 (e.g., Netscape™ browser) running on an operating system 36 (e.g., Windows 98™ operating system) on a hardware platform 38 (e.g., Intel™ hardware platform computer system including CPU, memory, storage device, ROM, and communication interface). The browser 34 includes a Java Virtual Machine (JVM) 40 for running Applets 42. Each server 18 in the middle tier 16, and each database server 24 in the back-end tier 20, in FIG. 1A can comprise a complete server platform 44 shown in FIG. 1B, wherein the server platform 44 includes server hardware 46 such as an Intel based computer system, operating system 48 such as Linux™, Solaris, etc. for running application server software 50 such as Apache. The application server 50 can include JVM 52 and servlets 54 as an extension, or can be built from the ground up on servlets.

Referring back to FIG. 1A, the database servers 24 have the same logical (unified) view of data in the database 26. In one example, the database servers 24 cooperate to create a unified view of data on shared or mirrored database(s) 26.

The computer system 10 further comprises a transparent back-end functional layer (FL) module 30 providing interface between the web-servers 18 and the multiple database servers 24. The FL module 30 is independent of the database server and database implementation, and only requires that the database servers 24 have a unified view of database data. As such, the FL module 32 can be utilized in conjunction with different database servers 24.

The FL module 30 dynamically distributes client transactions (requests) via the Web servers 18 across the multiple database servers 24 using connections to the database servers 24, while appearing as a single database server to the Web servers 18. The FL module 30 hence hides the implementation of database system 22 from the Web servers 18. As a result, the multiple database servers 24 appear as one database server to the web servers 18. In one embodiment, the FL module 30 includes a database load-balancing (LB) module 32 for assigning transactions to respective ones of the multiple database servers 24 to balance respective loads of the multiple database servers 24. The LB module 32 allows incoming transaction traffic to be distributed efficiently, providing greater economies of scale and fault tolerance.

In one embodiment, the LB module 32 monitors the state of the respective multiple database servers 24 and selectively routes transactions to the database servers 24 to optimize performance and availability. The LB module 32 ensures that transactions are routed to e.g. most available database servers (nodes) 24, providing predictable quality of service. The LB module 32 provides high performance and high scalability, and thereby eliminates the database back-end bottleneck for multi-tier computer systems such as utilized in business environments using Internet and WWW. Further, as described below, in one version the LB module 32 can include dual active—active or active-passive load balancing models, thereby eliminating single point of failure on the LB module.

To perform database load balancing, in one embodiment, the LB module 32 comprises one or more load balancing schemes/methods/processes for assigning incoming transactions to said multiple database servers 24. The load balancing schemes can include e.g.: (1) Round Robin; (2) Ratio, wherein weighting factors are assigned to each database server; (3) Least Number of Connections (LNC), wherein a database server with the least number of connections is selected; (4) Fastest Response Time (FRT), wherein the database server with the fastest measured response time is selected; (5) Observed, a combination of LNC and FRT; and Predictive, wherein the database server with an observed improving performance is selected. Other load-balancing schemes are possible and can be utilized. The LB module 32 can utilize one of, or a weighted sum of two or more of, the above load balancing schemes with manually or adaptively adjustable weighting functions (factors) to assign incoming client requests from web servers 18 to the respective ones of the multiple database servers 24 to balance the load of the database servers 24.

The LB module 32 selects a database server 24 to assign a client 14 request (transaction) from a web server 18 thereto, and passes the request from the web server 18 to the selected database server 24. The LB module 32 then receives a result from the selected database server 24, and sends the result back to the web server 18 to pass on to the client 14. As such, preferably the database load-balancing module 32 is transparent to the web servers 18 and the clients 14.

In a conventional multi-tier environment based on WWW, a request for information residing in a database is generated from a client web browser. The client browser then sends a request to the web server residing in the middle tier. In one example, some requests ask for static content of a page and are handled directly by the web server. Other requests ask for dynamic content (e.g., video/audio streaming) and are handled by programs (e.g., MP3) running remotely or locally in relation to the web server. A request can be in the form of an HTTP request asking for information stored in a database (e.g., about a book title). The web server translates the request into an SQL query, and sends the request to, and receives response from, the database server (e.g., dynamic content in e-commerce applications).

In one version, the web server located in the middle tier receives the request and handles the processing through the use of Common Gateway Interface (CGI) to create dynamic content. With CGI, the web server passes the request to the external data source, namely database server, in the back-end tier, and the web server receives the result from the database server and passes it to the client. There is a limit on the number of concurrent requests a database server can handle because the database server must create a new process every time the database server receives a new request. A CGI program also cannot interact with the web server and take advantage of its capabilities directly once it begins execution because it is running in a separate process.

According to the present invention, to alleviate the above problems, in one embodiment the LB module 32 comprises a process to service multiple requests by e.g. multi-threading and interprocess communication. Multi-threading is an extension of time sharing in computer systems that provide impression of performing several processes simultaneously by running each process for a short period of time, then saving its state and switching to the next process and so on. Threads extend the concept from switching among several processes (different programs) to switching between several different functions executing simultaneously within a single process. Multi-threading provides more efficient utilization of computer resources such as controlling and responding to GUIs, performing file I/O, perform computation, all in the same process (program). Server part of a client/server model can be efficiently implements in the form of a multi-threaded program (process). For example, instead of starting a new program (process) with each new client 14 request, the LB module 32 spawns a new thread within the same program to handle the request and hence achieves better resource management (descibed further in relation to FIG. 10B).

Further the LB module 32 utilizes at least one interface for connecting to, and communication with, the database servers 24. In one version, the LB module 32 is implemented to transparently communicate with the middle-tier web servers 18 and the back-end tier database servers 24. The LB module 32 is implemented as object-oriented software that can be easily plugged into web browsers 18 and be used for building web-based applications and Graphical User Interfaces (GUIs) along with built in database access methods, security, and networking support. The LB module software can execute on several different computer systems by layering libraries on top of any operating system, and provides a robust method of integrating incompatible computer systems within the framework of e.g. reusable component software, thin client-server software, network programming, secure browser-based software, threaded multimedia code, etc. For the server side, the LB module software uses servlet technology to make low level details of programming tasks such as raw sockets into a more productive application level, and provides a standard generic and portable mechanism for efficiently developing modular server side applications such as generating dynamic web content.

Java™ technology by Sun Microsystems™ and servlet application programming interface (API) provides an example implementation platform for the LB software, to transparently communicate with the middle-tier web servers 18 and the back-end tier database servers 24. The LB module 32 utilizes Java-based servlet technology to implement a process to service multiple requests using multi-threading in Java. Any technology component that can interact with functionality such as provided by Java-based servlet technology directly or indirectly is capable of utilizing the LB module 32 of the present invention. A database load balancing module 32 according to the present invention provides an independent layer between the middle and back-end tiers 16 and 20, respectively. Functionality such as provided by e.g. servlet chaining and interservlet communication are utilized to handle a client request through a sequence of servlets as discussed.

In one version, servlets include modules that extend request/response-oriented servers, such as Java-enabled web servers. For example, a servlet can take data in an HTML order-entry form and apply business logic used to update an order database. Servlets can be embedded in many different servers because the servlet API (used to write servlets), assumes nothing about the server's environment or protocol. Servlets effectively replace Common Gateway Interface (CGI) scripts. Servlets also resolve server-side programming with platform-specific APIs (they are developed with the Java Servlet API, a standard Java extension).

Although servlets are most widely used within HTTP servers and can be used to handle HTTP client requests, servlets can be deployed in conjunction with any existing server including database servers. For example, servlets process data posted over HTTP requests using an HTML form, including business data. Servlets can also be used to solely create the infrastructure of an application server rather than as an extension to the existing server. A servlet can handle multiple requests concurrently, and can synchronize requests. Servlets can forward requests to other servers and servlets. Thus servlets can be used to balance load among several servers that mirror the same content or have a unified logical view of the same content. In addition servlets can partition a single logical service over several servers, according to task type or organizational boundaries, independent of the specific implementation of the technology.

Referring back to FIG. 1A, each web server 18 translates an HTTP request sent from a client 14 web browser 34 in the front-end tier 12, to an SQL query (transaction/request). The LB module 32 establishes connection with the database servers 24 for transaction communication between the webservers 18 and database servers 24 such that the LB module 32 functions independent of the choice of database servers and databases. The database servers 24 have a unified data view of data the database 26. In one example, said connections between the LB module 32 and the database servers 24 are established using a database server connection interface such as e.g. the database connectivity API of Java technology (Java DataBase Connectivity™ (JDBC) from Sun Microsystems). JDBC comprises a portable database connectivity tool that provides universal interface into SQL databases. The connection interface can hence be used among a number of different SQL database servers 24 (e.g., Oracle, Sybase, Informix, MS-SQL, MySQL, mSQL, etc.). The connection interface can be deployed to build applications that can be equally run on any different database. Any other database connectivity means that provides unified interface into the database servers 24 can be equally utilized. The SQL query is gradually processed by a back-end tier database servers 24 accessed via JDBC. The LB module 32 can interact with a variety of different database servers 24 that provide a unified view of database data. For example, a low cost freeware database management systems (DBMS) such as MySQL originally implemented by TcX or mSQL originally implemented by David Hughes can be utilized.

The communication protocol between the database LB module 32 and the web servers can comprise, for example, Remote Method Invocation (RMI), Remote Procedure Call (RPC), Common Object Request Broker Architecture (CORBA), or other remote communication methods. In Java-based environments, RMI is the communication scheme between web servers and the LB module 32.

As described below by way example in conjunction with FIGS. 2A–D, the communication model between the database LB module 32 and the database servers 24 utilize connection interfaces such as e.g., JDBC API and an optimized transaction processing method such as a servlet pool with multiple instances and direct connections to the database servers 24. Alternatively, the transaction processing method can utilize database pooling with a single servlet instance and multiple connections to the database servers.

Figure 2A:
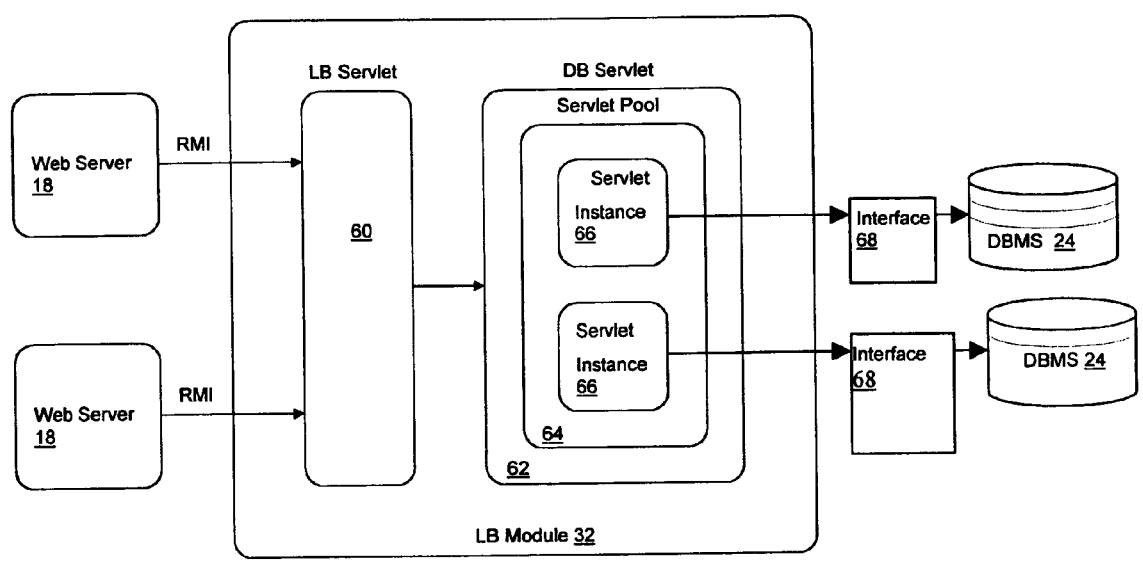
FIG. 2A shows an example block diagram of an embodiment of the functional architecture of load balancing module of FIG. 1A.

Referring to FIG. 2A, in one version, the database LB module 32 utilizes servlet chaining and interservlet communication to provide the database load-balancing and database connectivity. Interservlet communication model comprises an internal communication scheme among multiple servlets in which e.g. a first servlet passes the result locally to the second servlet. Servlet chaining and interservlet communication include a process in which a number of servlets cooperate to impact the content of a request from a requester in a specified sequence. Each servlet in a chain/sequence processes and passes its output to the next servlet. The last servlet in the chain sends the result back to the requester which in turn can be another server. The servlets rely on an interservlet communication model (servlet collaboration) in which cooperating servlets share information through the use of systems properties list, a shared object, or inheritance. In one embodiment, the request (transaction) from a client 14 is sent to a web server 18 which forwards the request to the LB module 32 in sequence. The LB module 32 selects a database server using load-balancing schemes, and routes the request to the selected database server. Upon receiving a result from the selected database server 24, the LB module 32 sends the result back to the web server 18 which in turn forwards the result to the client 14.

The LB module 32 includes a chain of servlets comprising a database load balancing servlet (LB servlet) 60 and database connectivity servlet (DB servlet) 62, as well as remote communication models (e.g., RMI) with the web servers 18. The LB module 32 receives a request from a web server 18 via the use of RMI or some other communication scheme. The LB servlet 60 assigns an arriving request/transaction to a database server 24 according to a load balancing scheme, or a weighted combination of two or more load-balancing schemes. Each load-balancing scheme identifies a potential/candidate database server for assigning the arriving transaction thereto, based on the previous load history of the database server. The previous load history of the database server is determined as function of a number of previous assignment iterations. Weighting factors can be appropriately adjusted to have a maximum or minimum impact from a desired load-balancing scheme in final selection of a database server by the load-balancing servlet to process the request.

The selection result of the LB servlet 60 is then passed to the DB servlet 62 through a servlet chain. A servlet chain includes a sequence of servlets that cooperate to create content in a process. The arriving request is sent to the first servlet in the chain. The response from the last servlet in the chain is returned. In between, the output from each servlet is passed as input to the next servlet. Cooperating servlets may rely on three types of interservlet communication models: (1) servlet manipulation, wherein one servlet directly invokes the methods of the other servlet, (2) servlet reuse, wherein one servlet uses another's abilities for its own purposes, or (3) servlet collaboration, wherein cooperating servlets share information through the use of system properties, a shared object, or inheritance. Servlet collaboration is the most common interservlet communication model.

In one version, the DB servlet 62 includes a servlet pool 64 of servlet instance (connections) 66 to the database servers 24 using a connection interface 68. The DB servlet 62 establishes a connection (or uses an existing connection)

to the selected database server 24, sends the request to the selected database server 24 for processing, receives the request result back from the selected database server 24, and sends the result back to the requesting web server 18. In one version, the interface connections comprise JDBC connections. As discussed, JDBC is a Java API and hence is considered a software connection. JDBC relies on low a level socket communication model to communicate with a database. The Java software package relies on Java Virtual Machine (JVM) as the compiler. Ports of JVM exist for different operating systems running on different hardware (e.g., Solaris operating system on Sparc Sun Microsystems hardware platform or Linux operating system on Pentium Intel hardware platform).

The architectural block diagram in FIG. 2A also provides a servlet interaction model in the LB module 32 for a Java implementation of the LB module 32 on a multi-tier architecture. Database systems can achieve redundancy and clustering in two ways: (1) relying on mirroring wherein different physical databases have the identical contents, and a synchronization mechanism is used to ensure the mirroring operation (e.g., Informix); and (2) relying on a shared storage among multiple DBMS', wherein mirroring is not utilized because multiple DBMS' rely on the same physical database (e.g., Oracle).

The architecture in FIG. 2A utilizes remote servlet communication and servlet chaining/interservlet communication techniques. Each web server 18 is a stand-alone server that may or may not rely on a server-side utility such as Java servlets or CGI scripts. The LB module 32 comprises an independent server utilizing Java-based server-side utility in the form of a servlet chain. Each web server 18 remotely communicates with the LB module 32. As specified, the communication can utilize any communication protocol such as RPC, CORBA, or RMI. In FIG. 2A, the employed communication tool is Remote Method Invocation (RMI). The web servers 18 translate an HTTP request (transaction) to an SQL query and send it to the LB module 32 via the remote communication protocol.

The LB servlet 60 receives the SQL request, and selects a database server according based on one or more load balancing schemes. The LB servlet 60 then passes the request along with the identification of the selected database server to the DB servlet 62. The DB servlet 62 uses the JDBC connection pool 64 to communicate with the selected database server, and sends the SQL query to the selected database server. The DB servlet 62 then receives a result back from the selected database server, and forwards the result to the requesting web server 18 (requester). The DB servlet 62 utilizes optimized transaction processing using a servlet pool 64 including a number of servlet instances 66 with direct connections to the database servers 24.

Figure 2B:
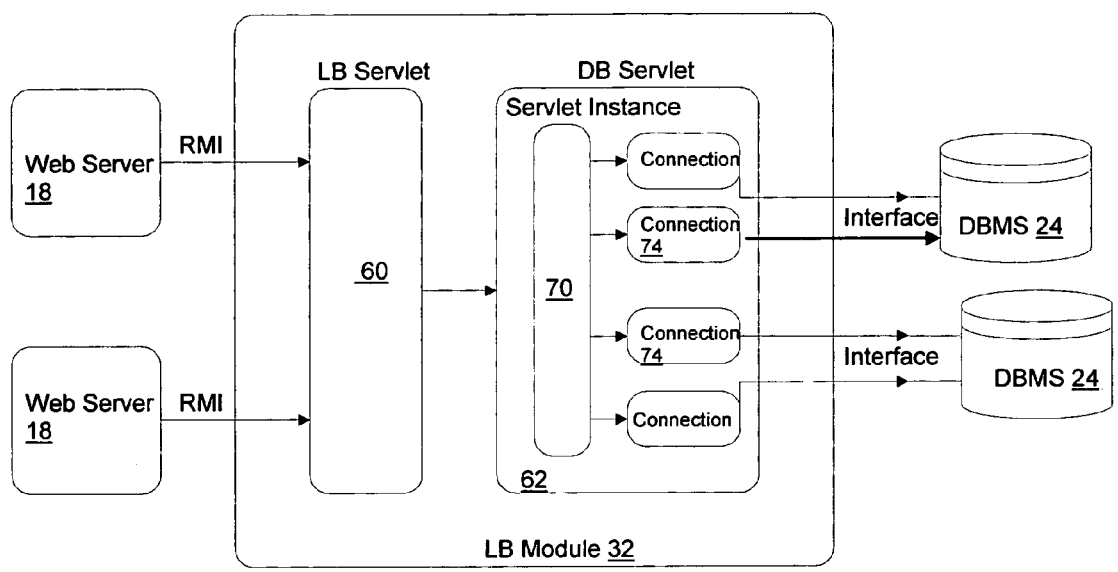
FIG. 2B shows another example block diagram of an embodiment of the functional architecture of load balancing module of FIG. 1A.

As shown in FIG. 2B, alternatively the DB servlet 62 can include a servlet instance 70 attached to a connection pool 72 having a number of direct connections 74 to the database servers 24. The DB servlet 62 includes a set of connections 74 to the database servers 24 and selects a connection from that set to the selected database server. Another example replaces RMI with CORBA, the LB and DB servlets with multiple CGI processes, and the JDBC connections with native DBMS connections. The database servers 24 have unified views of the data in the database by e.g. either utilizing mirroring or shared DB disk farm. The DB servlet 62 in FIG. 2B only instantiates a single servlet object 70 that can use multiple instantiated connection objects 74 to different database servers 24 whereas the DB servlet 62 in FIG. 2A instantiates multiple servlet objects 66 each of them carrying a single connection to one of the database servers 24.

Figure 2C:
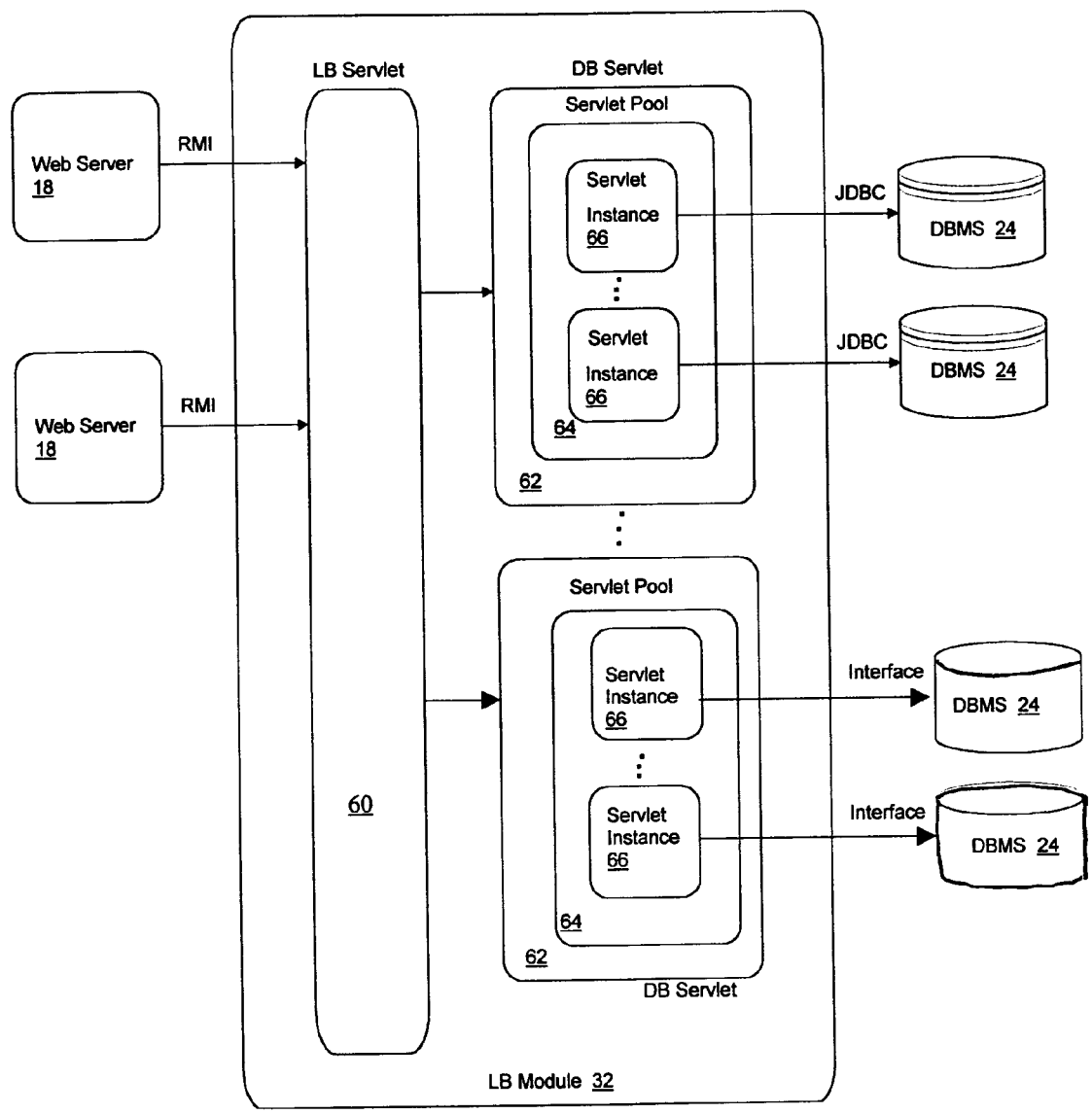
FIG. 2C shows another example block diagram of an embodiment of the functional architecture of load balancing module of FIG. 1A.
Figure 2D:
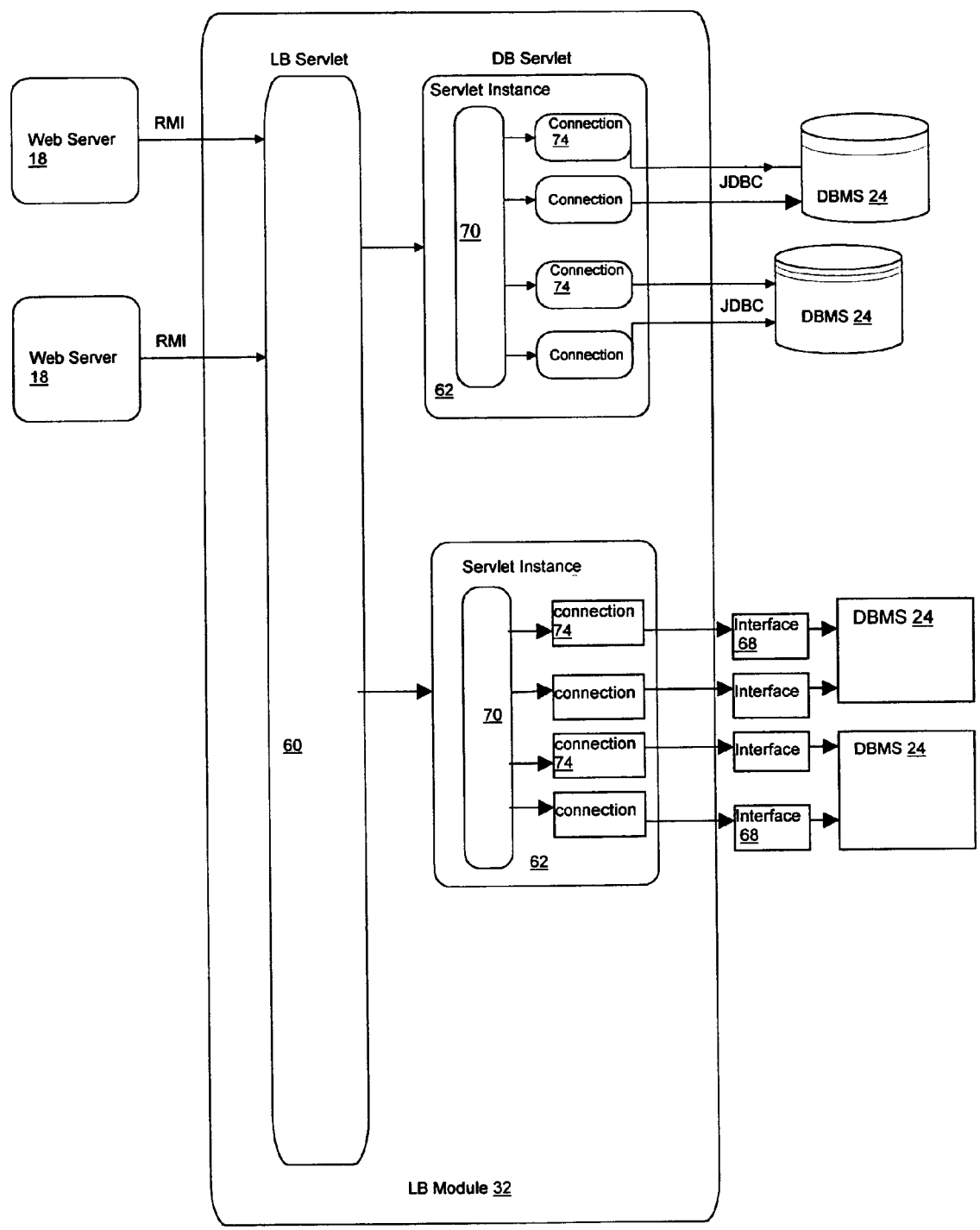
FIG. 2D shows another example block diagram of an embodiment of the functional architecture of load balancing module of FIG. 1A.

Referring to FIG. 2C, in another embodiment, each LB module 24 includes one LB servlet 60 and one or more DB servlets 62 (i.e., a one-to-many relationship between one LB servlet and several DB servlets). The LB servlet 60 provides the load balancing function for each database implementation using a DB servlet 62 for that database implementation. All of the connections 66 in each DB servlet 62 connection pool 64 are exclusively used for a specific database implementation. As shown in FIG. 2D in another embodiment, the LB servlet 60 communicates with each DB servlet 62 that includes one or more connections 74 to one or more database servers 24. The DB servlet 62 that has connections to all of DB servers with the same implementation is dedicated to the corresponding LB servlet 60 and cannot be shared with another LB servlet of another LB module (this holds true even in the case of dual LB turnkey LB modules/servers).

In FIGS. 2C–D, the database load balancing function according to the present invention applies to two or more database servers 24 with the same implementation. The LB module 32 operates with one or more sets of database servers 24 at the same time. For example, the LB module 32 can operate with a set of two MySQL database servers and another set of two Oracle database servers simultaneously, wherein the database load balancing function in each set of database servers is separate from the other set of database servers. As such, the transaction/request load is balanced against the database servers belonging to the same set with same implementations and is independent from the other sets of database servers. The LB module 32 utilizes connections according to one or more interfaces 74 (e.g., JDBC) with each set of database servers, for communication with the database servers. The LB module 32 and the database servers in each set of database servers utilize the same connection interface (e.g., JDBC).

As such in FIG. 2C, one LB servlet 60 works with multiple DB servlets 62 inside one LB module 32. The LB module 32 includes on LB servlet 60 and multiple DB servlets 62 each connected to a set of database servers 24. Each DB servlet 62 is connected to a number of database servers 24, and each set of database servers can have a different implementation. For example a first DB servlet 62 can work with MySQL database servers using JDBC, while a second DB servlet 62 can work with Oracle database servers using an interface 74 for connection. The same LB servlet 60 inside LB module 32 can manage different database load balancing tasks for different sets of DB servlets 62 database servers 24.

In one version, the load-balancing module 32 comprises servlets supported by e.g. an Apache™ server, Sun Microsystem™ Java Web Server, Netscape Enterprise server, Lotus's Domino Go Web Server, and IBM's WebSphere Server, and running on operating systems such as e.g. Linux, FreeBSD Unix platform, Sun Solaris, IBM AIX, HP HP-UX, SGI IRIX, etc. The choice of above operating systems and servers are optional and implementation specific. For example, another choice includes creating a specific load-balancing application server using merely servlet technology. The application server can run on Linux Operating System (OS) and Intel hardware platform.

The LB module 32 can be implemented for any server supporting functionality of Java servlets and running on any operating system. In the example implementation herein, the LB module 32 utilizes servlet chaining and interservlet communication techniques to handle a client request through a sequence of servlets. The LB module 32 functions independent of the choice of database servers 24 and databases 26, wherein the database servers 24 have a unified data view of data in the databases 26. Further, for example a user friendly Java-based Graphical User Interface (GUI) using e.g. the Swing API of Java of Sun Microsystems, Visual Basic or Visual C++ from Microsoft, or freeware Tk/Tcl for Solaris, can be used to configure, setup, and manage the LB module. The GUI can also provide choice of load balancing schemes and weighting factors used by the LB module 32.

Figure 3:
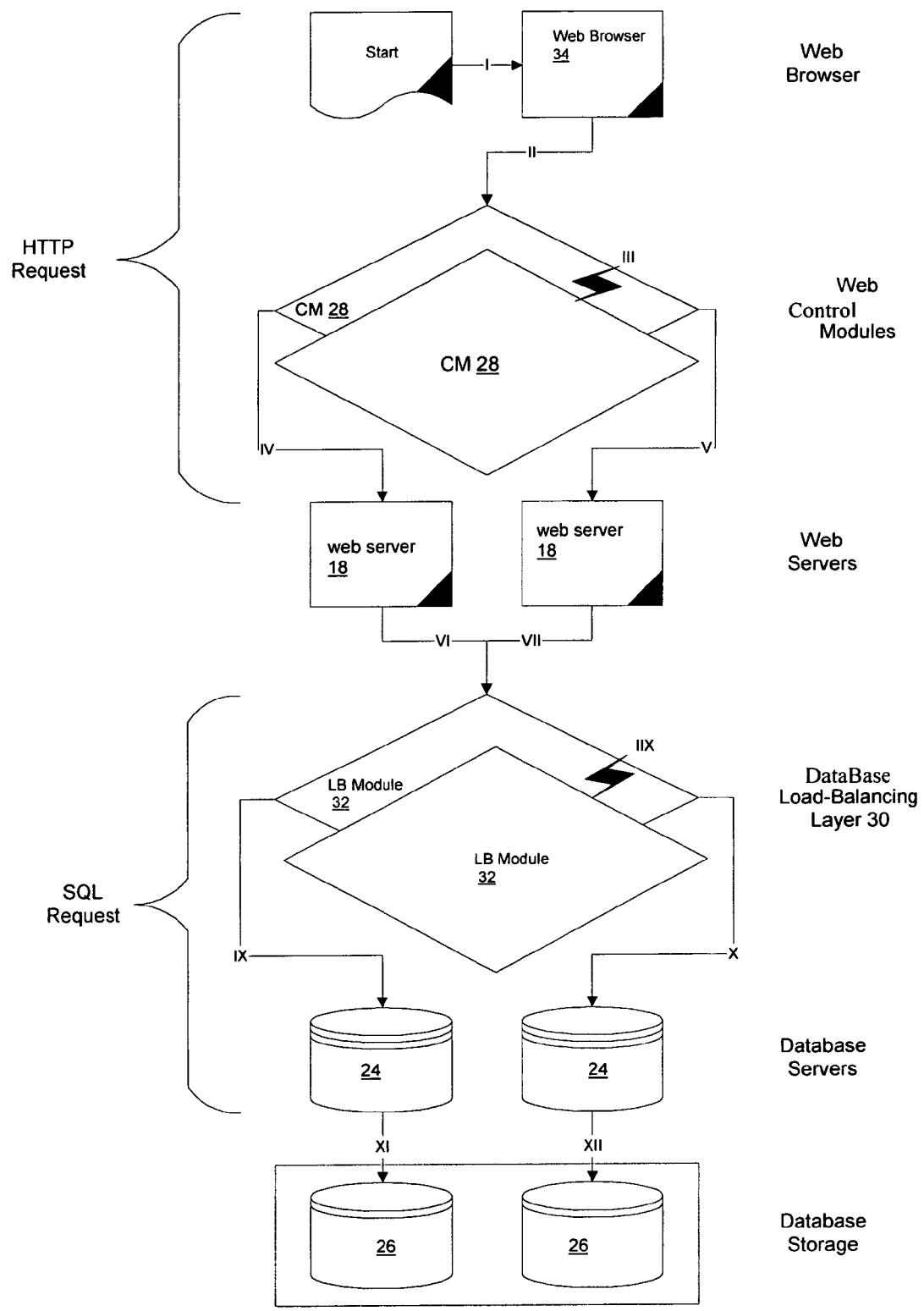
FIG. 3 show a flow diagram showing an example data flow through the multi-tier computer system of FIG. 1A.

Referring to FIG. 3, an example data flow diagram shows example logical flow of data (e.g., requests/transactions) through a multi-tier client-server computer system 10 of FIG. 1A, implementing the present invention. A user points the browser 34 from a remote client 14 across a wide or metropolitan area to a web server 18 co-located with, or remotely located against, other components of the e-commerce model including database servers, database storage, and database load balancing units. In one example, a user at a client 14 uses a web browser 34 to establish a connection II with a web server 18, using an HTTP address to request information stored in a database about an item. The middle tier 16 includes two control modules (CM) 28 with a heartbeat interface III therebetween. The control modules 28 provide a dual web HTTP routing model. The two control modules 28 provide redundancy in the form of an active control module and a passive control module, wherein when an active control module fails, the passive control module becomes active for routing transactions to the web servers 18. The status of an active control module is monitored by the passive control module via the heartbeat interface III. The heartbeat interface III can comprise a simple dedicated 10baseT Ethernet interface sending frequent ping requests between the two control modules 28.

The active control module 28 routes the HTTP request to a selected one of e.g. two web servers 18, using one of the data paths IV and V. The selected web server 18 parses the HTTP request and translates it to a standard SQL request. The web server 18 then send sends the request to the LB module 32.

In conventional multi-tier models the web servers 18 are directly connected to a database server and send their database inquiries to that single database server. A major disadvantage of such a method is that it can easily create a bottleneck from the database server under heavy load. However, according to one embodiment of the present invention, a load balancing layer 30 balances the load against multiple database servers 24 to prevent bottlenecks. The load balancing layer 30 hides the remaining underlying layers from the web servers 18 which view the database load-balancing layer 30 as a database server.

In this version, the load balancing layer 30 includes two database LB modules 32 described above, wherein at any given time, one LB module 32 is active and the other LB module 32 is passive. Data paths VI and VII show connections between individual web servers 18 and the active database LB module 32. The active LB module 32 balances the load against the multiple database servers 24, and the passive LB module 32 becomes active as the result of failure of the active LB module 32. A heartbeat interface IIX between the two database LB modules is utilizes, wherein the status of the active database LB module 32 can be monitored using the heartbeat interface IIX. The heartbeat interface IIX can comprise e.g. a dedicated 10baseT Ethernet interface sending frequent ping requests between the two LB modules 32. Further, each load balancing module can include the combination of load balancing schemes and heartbeat interface.

The active database LB module 32 accepts an SQL request from one of the web servers 18, selects a database server 24 among the multiple database servers (e.g., using one or more load-balancing schemes), and sends the SQL request to the selected database server 32. Data paths IX and X show the connections between the database LB modules and the database servers 28. The SQL request is sent to databases 26, wherein the physical databases can comprise storage modules in the form of e.g. centralized back-end storage repository shared among the database servers or mirrored segments with a unified view among the database servers 24 (DBMS). FIG. 3. shows the unified view wherein databases 26 show mirroring. For a shared disk, the database server 24 are connected to one database 28 with shared disk farm. Data paths XI and XII show the connections among the database servers 24 and the databases 26 (storage modules). Once the SQL request is processed by a database 26 storing the requested item information, and a result is sent back to the client 14 traversing the reverse path and translation.

In one version, the database LB module 32 performs availability analysis to determine assignment (routing) of incoming request/transaction traffic to balance respective loads of the database servers 24, and enhance availability of the multi-tier system 10. Factors that impact availability of a multi-tier system include:

(1) Server failure, wherein the server becomes unavailable due to a hardware or operating system failure.

(2) Software failure, wherein individual applications can hang or stop responding even though other applications are healthy.

(3) Content failure, wherein the server and application are working properly but are responding to requests with a response that does not contain the right content.

(4) Heavy traffic load, wherein servers have a well-defined response curve in relation to load and as traffic increases each server responds to requests promptly until the server reaches a point at which it stops responding to any request (i.e., the server is either on or it is off).

The method is equally applicable to three or more nodes. Each load-balancing scheme 80 in the LB module 32 performs a switching operation among a number of nodes (e.g., nodes A and B) to assign the current iteration load (request/transaction) to the node with the best-predicted performance according to a load history based on load measurement in one or more previous iterations represented by f[A(n)] and f[B(n)], wherein f[A(n)] represents selection of node A in each of one or more previous iterations and n>0 specifies the number of previous iterations (load history). Similarly, f[B(n)] represents selection of node B in each of one or more previous iterations and n>0 specifies the number of previous iterations (load history). Using prior load histories for nodes A and B, a switching logic 82 including a load balancing scheme determines which of the two nodes A or B is selected for iteration k to be active by operating on a logical switch, wherein if node A is selected then A(k)=X(k) and B(k)=0, and if node B is selected, then A(k)=0, and B(k)=X(k).

The LB module 32 employs database load-balancing schemes 80 to create scalable back-end architecture. As discussed, in one version of the LB module 32 database load balancing schemes 80 therein can be selected from Round Robin, Ratio, LNC, Fastest Response Time (FRT), Observed (OBS), or Predictive (PRD). Other load-balancing schemes can be utilized and are contemplated by the present invention.

Round Robin (RR): Referring to the example flowchart of FIG. 5A, the RR load balancing scheme treats all of the nodes the same way and assigns the load in a round robin fashion. In the current iteration k, the assignment to node A in iteration (k-1) is determined (step 100), and the assignment to node B in iteration (k-1) is determined (step 102). Then; the current request in iteration k is assigned to one of the nodes A and B that a request was not assigned to in iteration (k-1) based on the comparison result of the previous iteration (k-1) (step 104). The RR scheme is mostly suitable for identical database servers and uniform distribution of SQL queries.

Ratio (RATIO): Referring to the example flowchart of FIG. 5B, the RATIO load balancing scheme treats each node considering the performance of the individual node. The Ratio scheme assigns weights to each node and selects a node utilizing the network pipe size and other hardware components of each node. The Ratio scheme utilizes uniform distribution of SQL queries. In FIG. 5B, node A has a network pipe twice as wide as that of node B, and the Ratio scheme assigns one request to node B for every two requests assigned to node A. In the current iteration k, the assignment to node A in iteration (k-1) is determined (step 108), and the assignment to node B in iteration (k-1) is determined (step 110). If the assignment in iteration (k-1) was to node A, and the assignment in iteration (k-2) was to node A (step 112), then assignment in the current iteration is to node B. If assignment in iteration (k-1) was to node B, then assignment in iteration k is to node A (step 118). If assignment in iteration (k-1) was not to node B, and assignment in iteration (k-2) was to node B (step 116), then assignment in iteration k is to node A. And, if assignment in iteration (k-1) was to node A, but assignment in iteration (k-2) was not to node A, the assignment in iteration k is node A (step 118).

Figure 6:
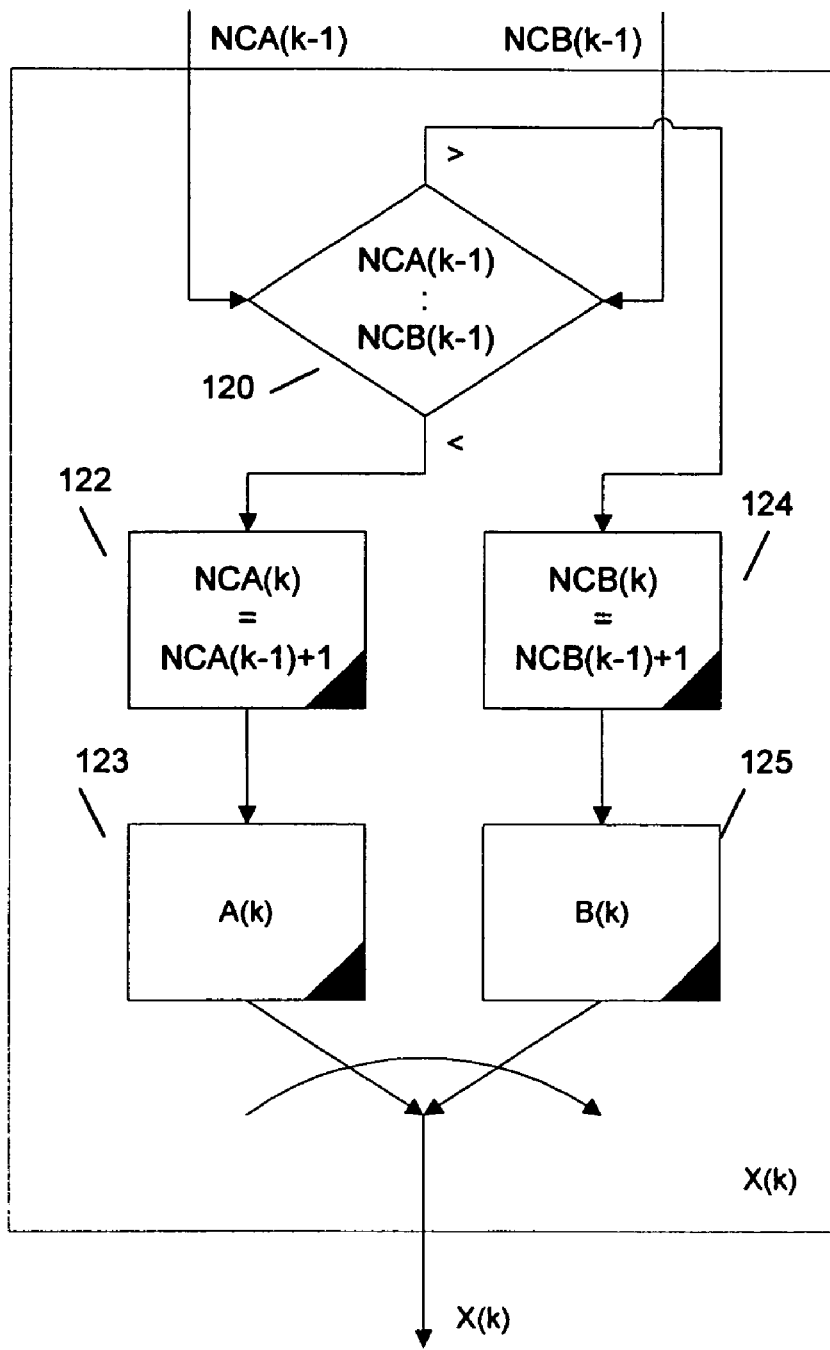
FIG. 6 shows an example flowchart of an embodiment of an LNC database load balancing scheme for the database load balancing module of FIG. 2.

Least Number of Connections (LNC): Referring to the flowchart of FIG. 6, LNC database load-balancing scheme selects the node with the least number of active database connections. The LNC scheme compares the number of active connections in for node A in iteration (k-1) to that of node B in iteration (k-1) (step 120), and chooses the node with least number of active connections, wherein NCA(k-1) represents number of connection for node A in iteration (k-1), and NCB(k-1) represents number of connection for node B in iteration (k-1). If NCA(k-1) is less than NCB(k-1) then, the LNC scheme then increments the number of active connections in iteration k, NCA(k) for node A (step 122) and selects node A for potential assignment in iteration k (step 123); otherwise, the LNC scheme increments the number of active connections in iteration k, NCB(k) for node B (step 124) and selects node B for potential assignment in iteration k (step 125). The LNC scheme performs well with uniform distribution of SQL queries and is suitable for heavy-load environments that can drive the database servers to the cut off state due to load level.

Fastest Response TIME (FRT): Referring to the flowchart in FIGS. 7A–B, the FRT database load balancing scheme selects the node with the fastest measured response time. The standard FRT scheme in FIG. 7A treats all of SQL queries the same regardless of the query size (suitable for uniform distribution of SQL queries). A normalized FRT scheme in FIG. 7B takes into account a normalized measure of the response time by considering the number of returned database records (works independently for both uniform and non-uniform distribution of SQL queries).

Referring to FIG. 7A, the standard FRT scheme inputs the measured roundtrip time required for sending the request to the database server and receiving the result back, rt( ), used by each node for accomplishing the load-balancing assignment operation for the last assigned task in iteration (k-i) or (k-j), wherein rt(A) for current iteration k is set to t(A, k-i) and rt(B) for current iteration k is set to t(B, k-j). In this example, t(A,k-i) is the measured roundtrip response time of node A at iteration (k-i), and t(B,k-j) is the measured roundtrip response time of node B at iteration (k-j). This assumes that node A was selected last at iteration (k-i) and node B was selected last at iteration (k-j) (short representations are rt(A) and rt(B), respectively). The standard FRT scheme chooses the node with the lowest roundtrip time, and updates the roundtrip time of the chosen node according to the current query. For iteration k, the scheme compares the response times for the nodes A and B, rt(A) and rt(B), respectively (step 130). If rt(A) is less than rt(B), then rt(A) is set to t(A,k) step (132) and node A is selected for potential assignment in iteration k (step 133); otherwise, rt(B) is set to t(B,k) (step 134) and node B is selected for potential assignment in iteration k (step 135). In this example, t(A,k) is the measured roundtrip response time of node A at iteration k should it be selected, and t(B,k) is the measured roundtrip response time of node B at iteration k should it be selected.

Referring to FIG. 7B, the normalized FRT scheme inputs the measured roundtrip time required for sending the request to the database server and receiving the result back, rt( ), used by each node for accomplishing the load-balancing assignment operation for the last assigned task in iteration (k-i) or (k-j), wherein rt(A) for current iteration k is set to t(A, k-i) and rt(B) for current iteration k is set to t(B, k-j). The normalized FRT scheme also accepts the query size, qs(.), wherein qs(A) is set to s(Auk-i) and qs(B) is set to s(B,k-j). In this example, s(A,k-i) is the query size of node A at iteration (k-i), and s(B,k-j) is the query size of node B at iteration (k-j). This assumes that node A was selected last at iteration (k-i) and node B was selected last at iteration (k-j) (short representations are qs(A) and qs(B), respectively). The scheme selects the node with the lowest roundtrip to query size ratio, and updates the roundtrip time and query size of the chosen node according to the current query. The normalized FRT scheme determines roundtrip time to query size ratio for each node (i.e. rt(A)/qs(A) for node A and rt(B)/qs(B) for node B), and compares the ratios (step 140). If the ratio for node A is less than the ratio for node B, the scheme sets rt(A) to t(Auk) and qs(A) to s(Auk) for node A (step 142), and selects node A for potential assignment in iteration k (step 143). Otherwise, the scheme sets rt(B) to t(B,k) and qs(B) to s(B,k) for node B (step 144), and selects node A for potential assignment in iteration k (step 145). In this example, s(A,k) and s(B,k) are the query sizes of nodes A and B at iteration k, respectively, should they be selected.

Observed (OBS): The OBS database load balancing scheme utilizes an adjustable weighted combination of LNC and FRT schemes. The OBS scheme can be effectively used in heavy-load environments with non-uniform distribution of SQL queries.

Predictive (PRD): The PRD database load balancing scheme selects the node whose OBS performance is improving. The PRD scheme can also be effectively used in the heavy-load environments with non-uniform distribution of SQL queries. The PRD scheme is similar to combination of FRT and LNC, wherein the measuring factor is the rate of change of the measuring factors displayed in FIGS. 6 and 7A–B.

Figure 8:
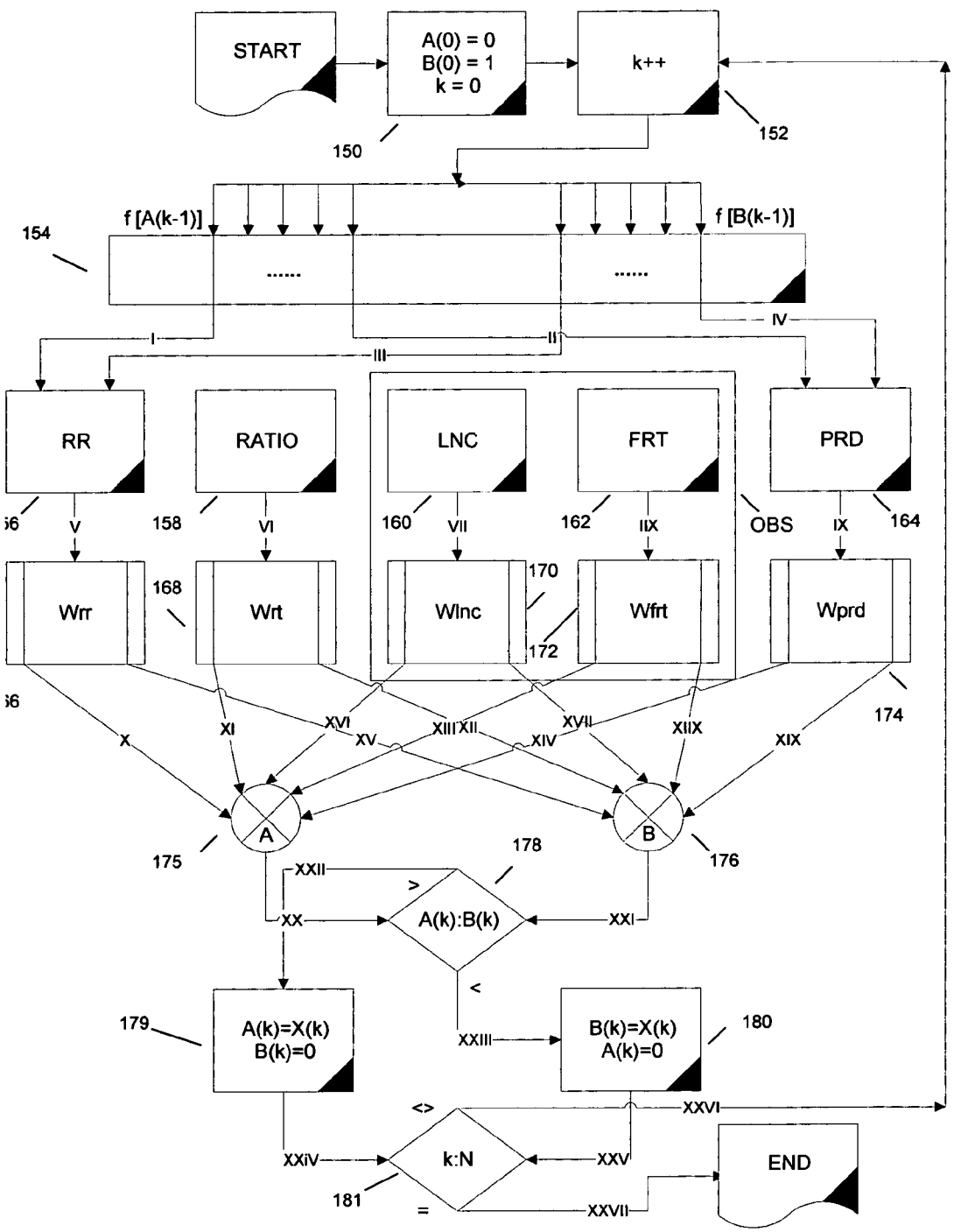
FIG. 8 shows an example flowchart of an embodiment of a database balancing data flow and method of the database load balancing module in FIG. 2.

For each of the above load balancing schemes, the selection of a node at each iteration can be maintained as load balancing history (e.g., in memory or on disk). FIG. 8 shows a functional/data flow diagram of load-balancing data flow in the overall database load-balancing modules 32 in FIG. 3, illustrating decision-making steps for selecting between the two nodes A and B for one or more of each of the above load-balancing schemes 80 (e.g., RR, LNC, RATIO, OBS as weighted combination of LNC and FRT, PRD, etc.). The data flow shows the initialization of the iteration measure k and the status of each node A(k) and B(k) (step 150). Thereafter the iteration measure k is incremented for each iteration (step 152), for each node the LB module 32 receives (k-1) instance choice results from the load history of the node (i.e., candidate/potential node for assignment of query in iteration (k-1)) (step 154), processes the results in different load balancing scheme/steps e.g. RR 156, RATIO 158, LNC 160, FRT 162, PRD 164; and makes the database server choice/selection for iteration k. Said load balancing schemes can be performed sequentially or in parallel, and each of the iterations indicates a measurement factor of the selected node.

The FRT 162 scheme keeps track of a normalized speed of each node by measuring the time required for accomplishing each query/request considering the size of the query. This works well for non-uniform distribution of database queries because the algorithm works independent of the query size. The information from iteration (k-1) includes the previously selected node and its response time. This information replaces the older measurement for the same node and will be compared with the last response time of the other node next iteration. The OBS scheme utilizes an adjustable weighted combination of LNC and FRT schemes 160, 162. The PRD scheme 164 measures the improvement rate of OBS scheme and selects the node with the best improvement in consecutive iterations.

The data paths V, VI, VII, IIX, IX display the selection by each of the above load balancing schemes of a potential/candidate node for assignment of a request in iteration k. Optionally, weighting functions/factors Wrr, Wrt, Wlnc, Wfrt, and Wprd can be utilized in steps 166, 168, 170, 172, 174, respectively, to take advantage of the different load balancing schemes, respectively, according to their order of importance. Assigning a value zero for each of the weighting functions eliminates the corresponding load balancing scheme from a final node selection process. Different algorithms can be used to adjust the weighting functions dynamically according to the information related to the corresponding node.

Each weighting function has two outputs corresponding to the two nodes, wherein each weighting function only applies to the selected potential node. This assigns a weighting function with a zero value to the node not selected. The addition steps 175, 176 (corresponding to nodes A and B), then, add the weighted sum of each node separately through the input paths X, XI, XII, XII, XIV and XV, XVI, XVII, XIIX, XIX, respectively. The results from the addition steps 175, 176 are then compared (step 178). In one example, if the value of the weights summation of the load balancing schemes specified by links XX and XXI is higher than that for node B, then node A is selected for assignment of the request/query/transaction in iteration k thereto (step 179); otherwise node B is selected (step 180).

(5) Network unavailable, wherein if the link between the server and the outside world becomes unavailable, the server becomes unreachable.

The above factors are addressed by e.g.: (1) proactive monitoring of the database servers; (2) proactive monitoring of software daemons running on the database servers; monitoring applications on the database servers to ensure that the content failure problem is resolved; (3) introducing a time out value to determine when a server becomes non-responsive due to heavy load, wherein if any of the database servers fail to provide a response within the specified time, another database server is utilized to respond to the content inquiry; and (4) if the database servers are geographically distributed, introducing a time out value can then determine database server unavailability, otherwise, all of the database servers located on the same segment of a network are impacted by network congestion the same way.

Accordingly, in one version the LB module 32 includes one or more load balancing schemes, providing database server load-balancing that can function with a number of different database servers providing unified view of database data, without dependence on any particular database server or database implementation. The LB module 32 provides both high availability and load balancing for the back-end database tier of the multi-tier scalable systems. High availability guarantees that end users always receive the quality of service desired.

Figure 4:
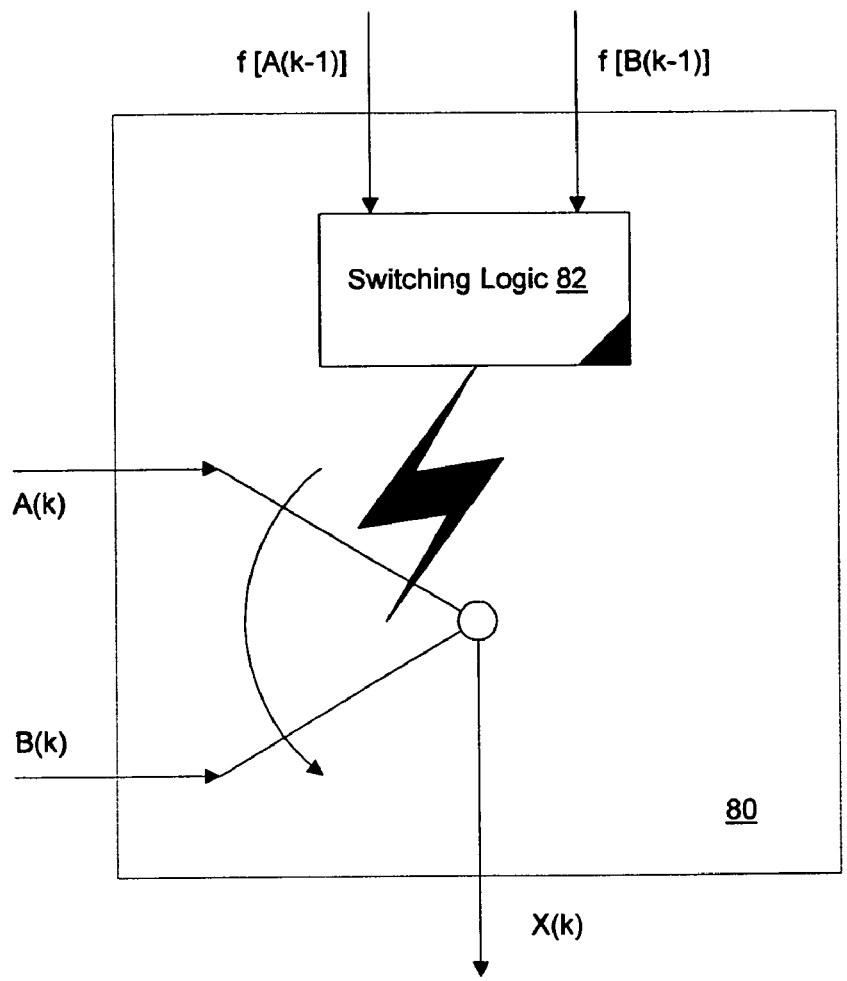
FIG. 4 shows an example flowchart of an embodiment of a general load balancing scheme.

FIG. 4 shows an example flowchart of database iterative load-balancing scheme 80 for balancing the load for two database servers 24 (e.g., nodes A and B), wherein:

k: The discrete measurement of time in iteration units, wherein each iteration corresponds to a new SQL request/transaction A(k): The status of node A in iteration k, indicating if node A has been selected to assign the new request thereto in iteration k, wherein node A is considered selected (active) for A(k)=1 and passive for A(k)=0

B(k): The status of node B in iteration k, indicating if node B has been selected to assign the new request thereto in iteration k, wherein node B is considered selected (active) for B(k)=1 and passive for B(k)=0

X(k): Symbolic notation indicating active status, i.e., X(k)=1 for all k

Optionally, the iteration count k is compared to a maximum number of iterations N (step 181), and the LB module stops load balancing if k reaches the maximum number N, otherwise the above steps are repeated. If N is set to infinity the LB module operates continuously. Error checking mechanisms can be utilized to take the appropriate action in case one or more nodes are not operating properly. Although the diagram in FIG. 8 describes the scenario for two database server nodes, all of the load balancing schemes can cover any number of nodes and, hence can be easily generalized to a higher number of nodes. Further also more than one load balancing scheme is utilized above to select a node for assignment of request in iteration k, the present invention contemplates using only one load balancing scheme to select a final node for each request assignment in each iteration.

Figure 9:
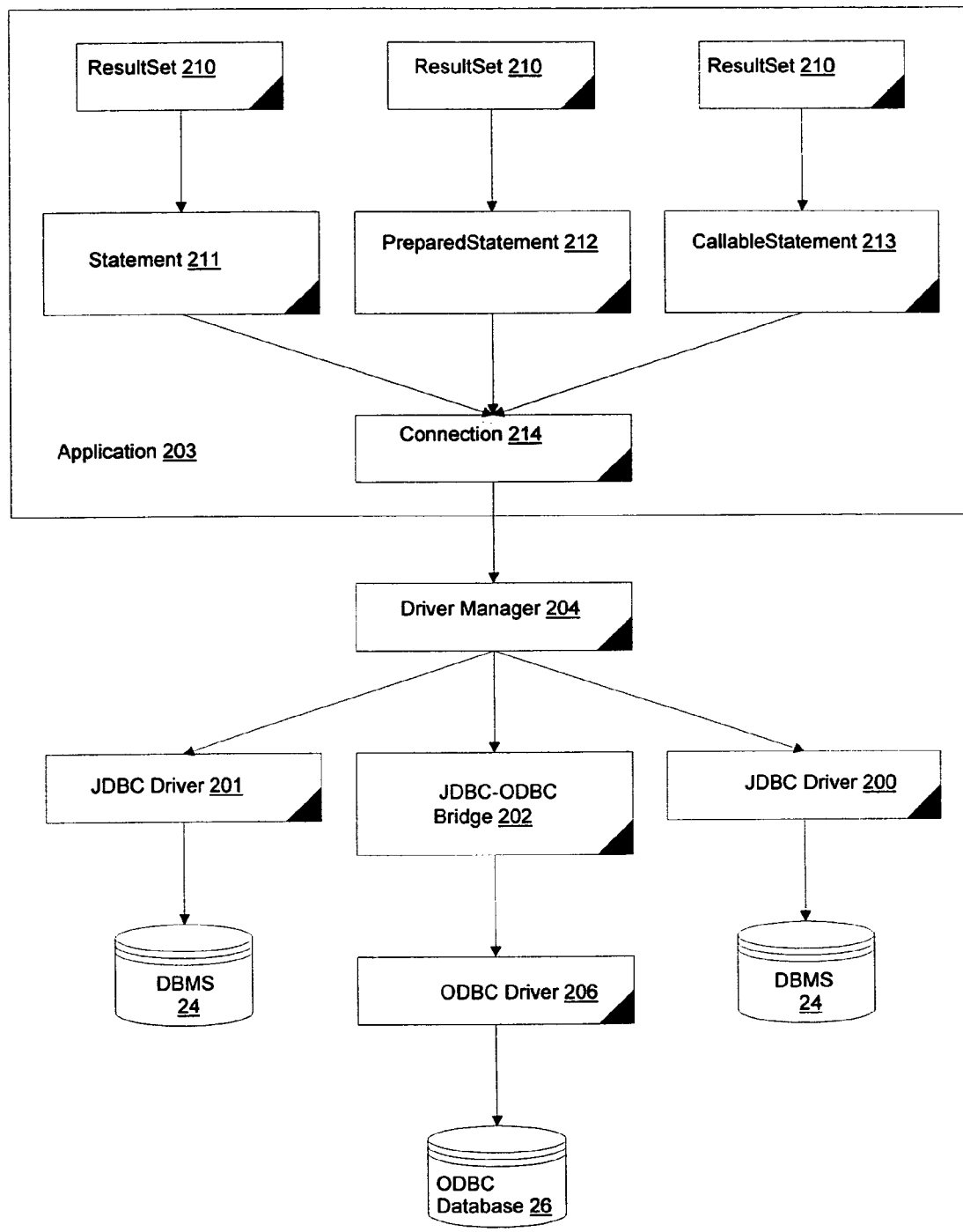
FIG. 9 shows example flowchart of an embodiment of a database connectivity model/architecture for implementing a database load balancing method according to the present invention.

The functional/data flow diagram in FIG. 9 shows example Java database connectivity model for a version of the LB module 32 utilizing JDBC API, functionally illustrating an enlarged data path in FIG. 3 from one of the LB modules 32 to one of the combinations of database server and database entities 24, 26, through the data paths IX or X, respectively, in FIG. 3. Though JDBC is utilized for this example, but other database connectivity interface models can equally be utilized. As described, JDBC is an SQL-level API that allows execution of SQL queries and retrieval of results, if any. The API is an abstraction of interfaces designed to perform actions against any database relying on dynamic run-time database access methods.

FIG. 9 displays interaction of client queries via a web server 18 directed by the LB module 32 to a selected database server 24. As such FIG. 9 shows a connectivity dataflow model that illustrates how the LB module 32 interacts with a database server 24. A set of initial steps in the connectivity model include loading drivers, and establishing connections 214 to the database servers 24. JBDC driver categories can include:

(1) JDBC-ODBC drivers 202, 206 which use bridge technology to connect a Java client to an ODBC database server 24. In this example, the Java client can comprise one of the middle-tier web servers 18 that sends a query to the database. Such drivers are implemented using native code, and are generally most appropriate when automatic installation and downloading of a Java technology application is not important;

(2) Native-API partly Java technology-enabled drivers which convert JDBC calls into calls on the client API for e.g. MySQL, Oracle, Sybase, Informix, DB2, or other DBMS. These drivers, as in the bridge drivers, require that some binary code be loaded on each client machine;

(3) Net-protocol fully Java technology-enabled drivers which translate JDBC API calls into DBMS-independent net protocols that are then translated to DBMS protocols by servers. These net servers can connect all of their Java technology-based clients to many different databases. The specific protocol used depends on the vendor. In general, these are the most flexible JDBC API alternatives;

(4) Native-protocol fully Java technology-enabled drivers which convert JDBC technology calls into the network protocol used by DBMSs directly. This allows a direct call from the client to the database server and is a practical solution for Intranet access.

As described, Java comprises a software package that relies on Java Virtual Machine (JVM) as the compiler. A JVM running on a pair of hardware and software platforms creates byte code from Java source code that can be interpreted at the run time by any other JVM running on any other pair of hardware and software platforms (e.g., FIG. 1B). Ports of JVM exist for different operating systems running on different hardware platforms. Examples are Solaris O.S. on Sparc Sun Microsystems hardware platform or Linux O.S. on Pentium Intel hardware platform. There are three types of Java programs: stand-alone programs known as applications, programs that run inside client web browsers known as applets, and programs that run inside a server known as servlets. While the LB module 32 according to the present a invention takes advantage of Java servlets for core functionality, the GUI management utility takes advantage of Java applets to remotely manage the LB module 32 from the client browsers 34.

The components in FIG. 9 within dashed lines labeled as Application 203, are located in the DB servlet of the LB module, and the driver manager 204 and the drivers 200, 201 and 202 (e.g., Oracle driver, ODBC-JDBC bridge driver, MySQL driver) are available with standard Java distribution. The driver manager 204 includes a utility for loading the drivers 200, 201, 202, into the JVM. The JVM is not shown in FIG. 9 but it works within the context of Java application (i.e., there are three types of Java applications: stand alone, applet, and servlet) and acts to convert the Java code to byte code as described herein. Further, while establishing connections to the database serves 24, the driver manager 204 determines if each registered driver 200, 201, 202, recognizes an arrived URL. The URL refers to database connectivity URL within the context of Java.

The driver manager 202 then uses one of the drivers 200, 201, 202 that recognizes the URL to create a connection with a database server 24. A JDBC URL identifies an individual database server 24 in a driver-specific manner. A general format of a JDBC URL includes "jdbc:sunprotocol:subname", an example for ODBC-JDBC bridge driver includes "jdbc:odbc:somedb", The URL specifies JDBC, ODBC and the name of database and is usually accompanied by the user name and password for database access. Thereafter, steps specified in queries/requests, including reading data from database or writing data into database, can be performed.

The flowchart in FIG. 9 further shows the interaction between the Java application 203 (e.g., stand alone, applet, servlet, etc.), the JDBC driver (e.g., drivers 200, 201, 202), and the DBMSs 24. Each database management system 24 (e.g., Oracle, Sybase, Informix, MS-SQL, MySQL, mSQL, etc.) is accessed via a specific JDBC driver 200, 201 provided (e.g., JavaSoft for Open DataBase Connectivity (ODBC) supported databases, WebLogic for Oracle, Sybase, MS-SQL, Symantec for Oracle, Sybase, MS-SQL, MS-Access, SAS for SAS, Oracle, Informix, Ingres, etc.).

In the example of FIG. 9, the LB module 32 first loads a JDBC driver 200 into its own Java Virtual Machine (JVM). The JDBC driver 200 is for opening/establishing a connection with a database server 24. The GUI, described above, can be utilized to choose the database type used in a specific multi-tier system 10. Thereafter, the Driver Manager 204 opens a connection to a specific database server 24 wherein the database server 24 is specified by a specially formatted Universal Resource Locator (URL). The Driver Manager 204 and all other modules in FIG. 9 are interface classes of JDBC API, wherein the interface is a general behavior description for a class (object orientation). A class implements an interface according to its own pattern to behave a desired way.

In the DB servlet 62 of the LB module 32, optimized transaction processing methods, instance pooling and connection pooling are utilized, as described. The pooling mechanisms database access request. While the RR scheme 156 relies on iteration (k-1) to select a potential/candidate database server for to assigning the current request in iteration k to, without keeping a history of the past activity, the other load-balancing schemes shown rely on a number of previous iterations and in some cases a nonlinear function of those iterations to select a potential database server to handle the current request in iteration k. The inputs include information about each of the nodes separately.

Each load-balancing scheme receives two sets of inputs corresponding to the two nodes A and B. For example, the data paths I and III display the inputs for the RR scheme 156. These are iteration (k-1) samples which include a value one for the previously selected node or a value zero for the other node. The data paths II and IV show the inputs for the PRD scheme 164. The other schemes also have two sets of inputs corresponding to the two nodes (not shown in the flowchart for simplicity). Each of the load balancing schemes, then, processes the received input set and selects on the next iteration potential node accordingly.

To select a potential/candidate node for a request in iteration k, the RR scheme 156 only uses the iteration (k-1) node selection sample and selects the node not selected in iteration (k-1). The Ratio scheme 158 assigns each request to a node considering a performance measurement factor. For example, if the network pipe of node A is three times wider than that of node B, the Ratio scheme 158 assigns one request to node B for every three requests assigned to node A and hence keeps a history of the last few iterations. The RR and Ratio schemes 156, 158 are generally suitable for uniform distribution of SQL queries with comparable result set sizes. The LNC, FRT schemes 160, 162 are used in combination in an OBS scheme, and can be used with uniform or non-uniform distribution of SQL queries and different result set sizes.

The LNC scheme 160 always keeps track of the number of active connections to each node and selects the node with the lower number of database server connections. This works well for non-uniform distribution of database queries/requests/transactions because the larger size queries remain active for a longer period of time. Hence, the information from iteration (k-1) usually includes the selected node as well as the query size and optionally a performance keep a number of connections to each database server 24 and re-use them when necessary. This reduces the overhead of connection establishment and connection destruction greatly. The connections are created once and destroyed once.

Once the connection 214 is established, the Statement Block JDBC interface 211, or one of its more sophisticated versions (e.g., PreparedStatement 212 or CallableStatement 213) in the database server 24, execute SQL queries. PreparedStatement 212 extends the ability of Statement block 211 to bind input parameters to an SQL call just before execution. CallableStatement 213 relies on pre-compiled stored procedures that run faster than standard SQL queries and can also be used to return output parameters. The ResultSet block interface 210 is a representation format for the returned result of the query, and includes the result metadata including the number of rows, columns, search options, the maximum number of characters per column, etc. The result of the query from the database server 24 is sent to the LB module 32 to pass on to the requesting Web server 10 onto the client requester 14.

In the example embodiment herein, the web servers 10 support Java servlets. An example of such web servers is the Apache server with optional JServ module running on Linux operating system. The choice of the Apache web server is optional and the present invention can be implemented with any server that supports Java servlets, or the functionality provided by Java servlets. The web server 18, then, sends a SQL query to the LB module, wherein the LB module appears as a database server to the web server 18 (i.e., details of the LB module functionality are hidden from the web server). The LB module used database connectivity interface such as JDBC API to communicate with a selected database server and request services per the SQL query. Though in this example web servers support Java servlets, that is not required. The web server 18 may or may not support Java servlets. As long as the web server 18 sends an SQL query, the LB module 32 can interact with the Web server 18.

In one aspect, the present invention is directed to a load balancing of multiple servers, independent of database engine implementation. A database load balancing model according to the present invention evenly distributes the database load for as long as the database supports a unified view of the physical data to a number of database management systems (database servers) 24 running on different servers. In one version of the LB module 32 utilizing JDBC, all database servers 24 that support JDBC type functionality can utilize the LB module 32. Using functionality such as provided by JDBC API of Java technology and widespread support of different database vendors, a single tool for connecting to most of database engines is provided. The range of databases includes e.g. commercial database engines such as Oracle, Informix, Sybase, MS-SQL as well as freeware engines such as MySQL, and mSQL.

In one version he LB module 32 performs application specific (e.g., data base length query) load balancing, requiring application specific knowledge. Load balancing for a general IP model is disadvantageous as proper load balancing decisions cannot be made due to of lack of ample application specific information. The lower layer network packets cannot be balanced against databases because a number of packets not known to the IP load balancing module comprise a single database query. Each database query in general has a different size that is only known with application specific knowledge.

Conventional dependence of a multi-tier system on a specific database vendor prevents database load balancing to be applied to any other identical multi-tier system that replaces the back-end database tier with a different vendor component. An advantage of the present invention is that the LB module 32 can be equally applied to any database engine supporting functionality such as provided by e.g. JDBC and providing unified data view among a number of database servers. In one embodiment, the load balancing module 32 generates a weighted sum of several load-balancing schemes with manually or adaptively adjustable weighting factors. Using Java allows servlet chaining and interservlet communication protocols to provide transparent dynamic database content in a path that traverses the database server 24, the database load-balancing module 32, the Java-enabled web server 10, and the Java-enabled client 14.

A load-balancing module/method according to the present invention can be implemented in various embodiments, including for example: software embodiment, hardware embodiment, clustering embodiment, and turnkey embodiment (i.e. hardware/software also known as "thin server network appliance"), as described below. Further, the present invention can be implemented in conjunction with caching servers.

An example software embodiment comprises load-balancing software implementing the load-balancing module/method of the present invention, installed directly onto e.g. server 44 in FIG. 1B (e.g., including computer system, operating system, database software, etc.) or database server array. Important considerations for software-only embodiments includes hardware and operating system (OS) dependency. Software is installed and upgraded on each server in the network, and driver IP addresses are provided directly to the users.

An example hardware embodiment comprises a fast switching mechanism to perform load balancing in a 7-layer OSI model. The OSI model includes, from the bottom to the top, physical, datalink, network, transport, session, data representation, and application layers. The physical connection is in the layer 1 physical layer whereas the logical connection is in the layer 7 application layer. The layer 2 is the datalink layer and the layer 3 is the network layer. Said switching mechanism can perform load balancing at the Media Access Control (MAC) Layer (Layer 2) and Layer 3 in hardware. A central processor that executes background tasks such as routing, table and network management manages the switching.

An example clustering embodiment provides high scalability, high performance, and high cost characteristics. Clustering embodiment comprises processing on multiple servers and other host environments. A cluster model relies on multiple physical servers to act as one logical server. There are different clustering models. One model uses a peer-to-peer model in which each server keeps its own identity while having access to resources available in all other members of a cluster group (e.g., NCR life keeper). Another clustering model keeps the identity and the resources of each server of the cluster group separate, wherein a monitoring feature between the servers ensured that the resources of any failed server are transferred and managed by the other functioning servers of the group. Most of the models keep the failover operation transparent from the user point of view.

Figure 10A:
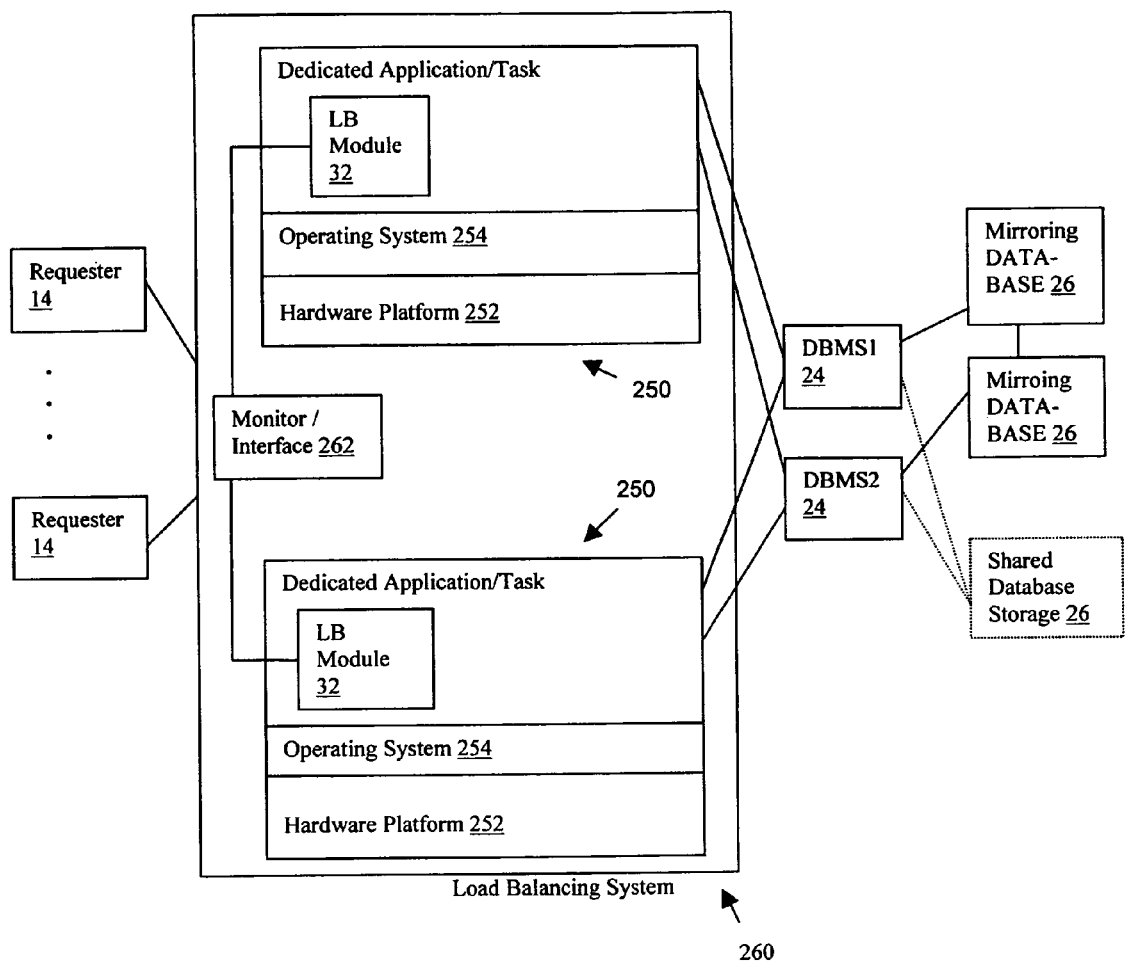
FIG. 10A shows an example block diagram of an embodiment of the functional architecture of a thin server application load balancing system according to an aspect of the present invention.

Referring to FIG. 10A, an example of turnkey embodiment of a load balancing system according to the present invention comprises "thin server network appliance" software/hardware module that enhance traffic performance. A thin server 250 appliance comprises a computer system configured to perform dedicated tasks efficiently. The computer system can include a hardware platform 252 and operating system 254 similar to those described in conjunction with server 44 in FIG. 1B. The resources of the thin server appliance 250 are only used towards accomplishing the dedicates tasks. An example of such a task includes one or more said LB modules 32 or a special caching engine. Preferably, the thin server appliance 250 has relatively lower overhead of management within a specific application context compared to a general purpose server/system. Turnkey load-balancing systems manage a specific server/application, are plug-and-play and maintain an open and flexible architecture to grow over time.

Figure 10B:
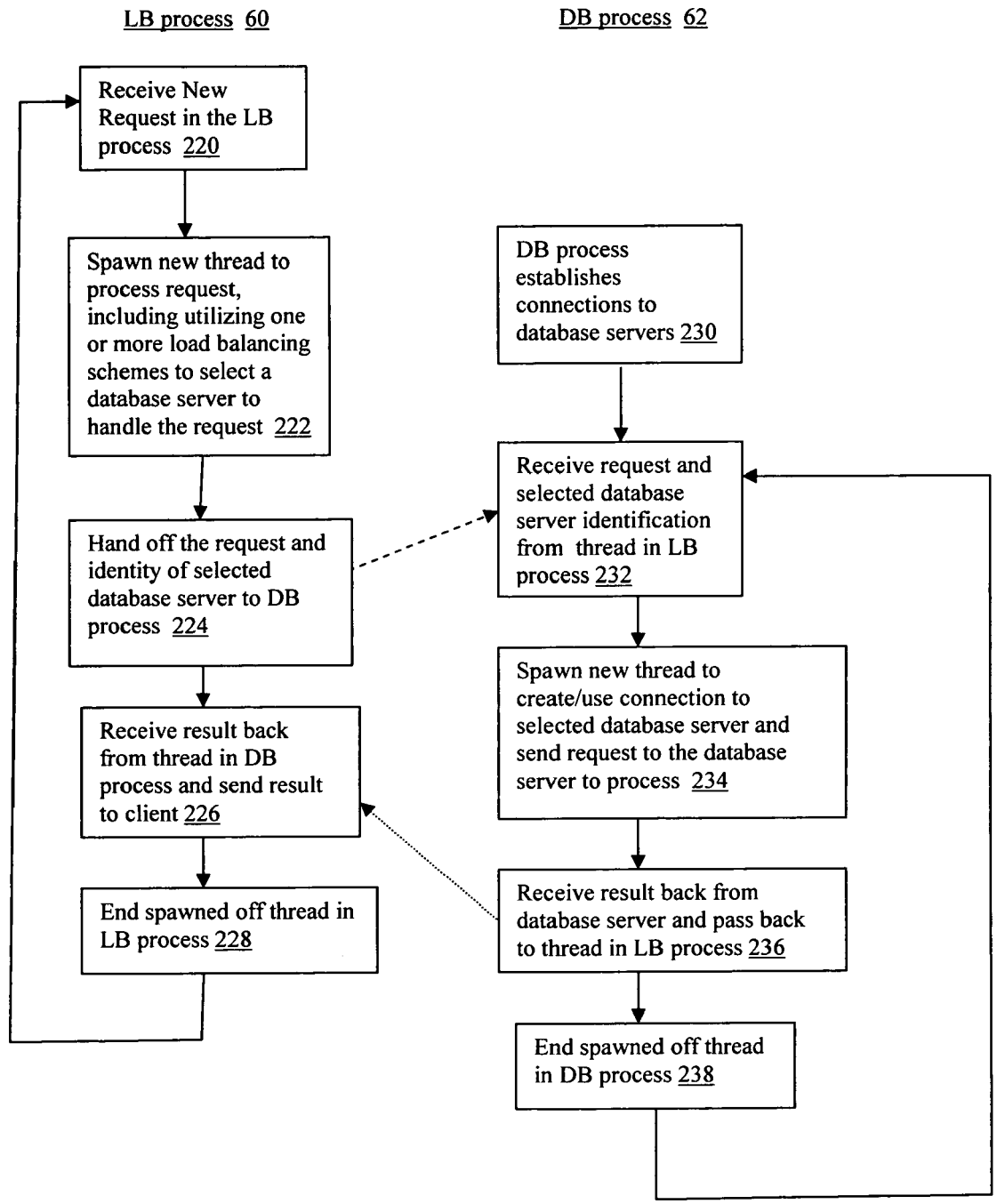
FIG. 10B shows an example flowchart of the processes within the load balancing module in FIG. 1A.

Referring to FIG. 10B, the LB module 32 in the thin server appliance 250 includes a collection of processes or programs. Specifically, in one version, the LB module includes the LB servlet/process 60 and one or more DB servlets/processes 62 (shown by e.g. in FIGS. 2A–D). With each new client request, a new thread within the same LB servlet process 60 can spawn off to service the request and later communicate with another thread in DB servlet process 62. In one example, one LB servlet process 60 and one DB servlet process 62 handle incoming requests, each process by spawning off a new thread after receiving a new request. As such, a new arrived request (step 220) can cause the LB process 60 to spawn off a new thread (step 222) to select a database server and pass the request to the DB process 62 (step 224). In one example, the DB process 62 establishes connections to database servers (step 230) and awaits receiving a request and identification of a selected database server from a thread in the LB process 60 (step 232), whereupon the DB process spawn a new thread therein to send the request to the selected database server using an existing or new connection to that database server (step 234). After the request is processed by the database server, the thread in the DB process 62 received a response/result back, and send the response to the thread in the LB process (step 236). The thread in the DB process then ends (step 238). The thread in the LB process, receiving the response form the DB process, passes the result back to the client (step 226) and the thread terminates (step 228).

Each thread is spawned/created to perform a special task (e.g., to perform a load balancing scheme, provide response to a special client request, communicate with a database server, etc.) and ends when the task is performed. The process (e.g., LB Servlet, DB Servlet, etc.) that spawns off threads remains executing for as long as the thin server appliance 250 and LB module 32 appliance remains up and running.

As shown in FIG. 10A, in one embodiment, in another aspect the present invention provides a load balancing system 260 including two redundant integrated load-balancers (LB modules) 32 between the database servers 24 and the clients 14, operating jointly as parallel and hot-spare load balancers. The LB modules 32 are shown as thin server appliances 250. A monitor/interface (e.g., heartbeat interface) component 262 provides routing of the incoming requests to one of the two LB modules 32 that is functioning. Further, each load balancing module can include the combination of load balancing schemes and a heartbeat interface therein. In one version, the LB module comprises a software component while the heartbeat interface comprises a network interface that performs pinging. The heartbeat interface can be a component of the thin server appliance and is suitable for two thin server appliances that act in an active-passive model. This redundancy offers fail-safe, cost-effective operation and significantly minimizes maintenance. Database servers 24 can be upgraded and managed without any downtime or affect on the network (e.g., multi-tier system).

Database 26, comprises a data storage repository and the view of data belongs to the database servers 24. The unified view of data can be achieved by e.g. having multiple database servers 24 looking at the same shared data repository 26 as in shared farm disk method, or by having dedicated data repositories per database server 24 that are mirrored and synchronized. The databases 26 are shown as mirroring in solid lines, and optionally as shared disk farm in dashed lines. In the shared data repository technique data consistency must be maintain by e.g. ensuring that different database servers 24 do not overwrite each other's transaction at the same time. In the mirrored technique, it must be guaranteed all changes in one data repository are indicated in all other data repositories. The unified view of data is nevertheless achieved by cooperation between database servers 24 (a database implementation dependent issue because of the nature of cooperation, and most DB implementations such as Oracle, Sybase, Informix, MySQL, etc. support the unified view of data).

Interaction of database load balancing modules 32 with caching methods is now described. Caching allows exchanging expensive network bandwidth with inexpensive storage. A caching server in general comprises a thin server appliance that resides on a Point-Of-Presence (POP) in the traffic path of the WWW. A POP example includes the main gateway of a company. When a user inside the company points a client browser to access data located remotely across the Internet, the content is cached into the cache server on its way to the client browser so that next time the user tries to access the same content, the browser uses the information from the local cache thin server present at the gateway of the company rather than again obtaining the content over the Internet and possibly facing congestion or other un-predictable network problems. A layer-7 (OSI model) load-balancing method is complementary to a caching system rather than competitive. The load-balancing and caching methods can be combined to offer a higher performance more scalable operating environment.

There are differences between LB operation (module) and caching. The most important one is that the POP used for the caching engine is usually in front of the middle tier and co-located with the middle tier, whereas the LB operation (module) applies to the back-end. In one aspect, the present invention is preferably directed on a turn-key system.

Because many online businesses use various database engines, the load-balancing methods according to the present invention are advantageous for such online businesses. Further, the present invention can be implemented with any database model capable of creating a unified view among multiple database servers, and process and database connectivity functions such as provided by Java. As such, the present invention is not dependent on any particular database.

The present invention is further advantageous for mid range online businesses that have not predicted purchasing expensive enterprise edition database models while still in need of a strongly scalable load-balancing method. The present invention provides cost effectiveness for the overall multi-tier computer system as well as end-user satisfaction. The present invention further enables building a complete low cost back-end tier relying on freeware database engines (e.g. MySQL) or other database engines of choice.

As such, the present invention can be implemented as a low cost turnkey system, with e.g. standard Intel hardware platforms and freeware Linux/JDK/JSDK software platforms, as a database load-balancing layer for a number of database engines. The present invention in a turnkey server appliance embodiment (thin appliance) acts as an independent extra layer in a multi-tier environment, leading to reduced database management overhead.

The present invention further provides high availability for a multi-tier computer system by managing load balancing independent of the database engines (database servers). Hence, problems with database engines are isolated from the operation of the multi-tier system, that can be blocked if relying on a single database server. In that latter case, if the database server malfunctions, no alternative for obtaining the requested data is available. Using multiple database servers, the LB module can avoid sending requests to the malfunctioning database server. In one version, the LB module checks the status of all database servers it manages ongoingly through the use of pings. Further, by implementing the active-passive dual database load-balancing modules, the present invention does not introduce a single point of failure.

Figure 11:
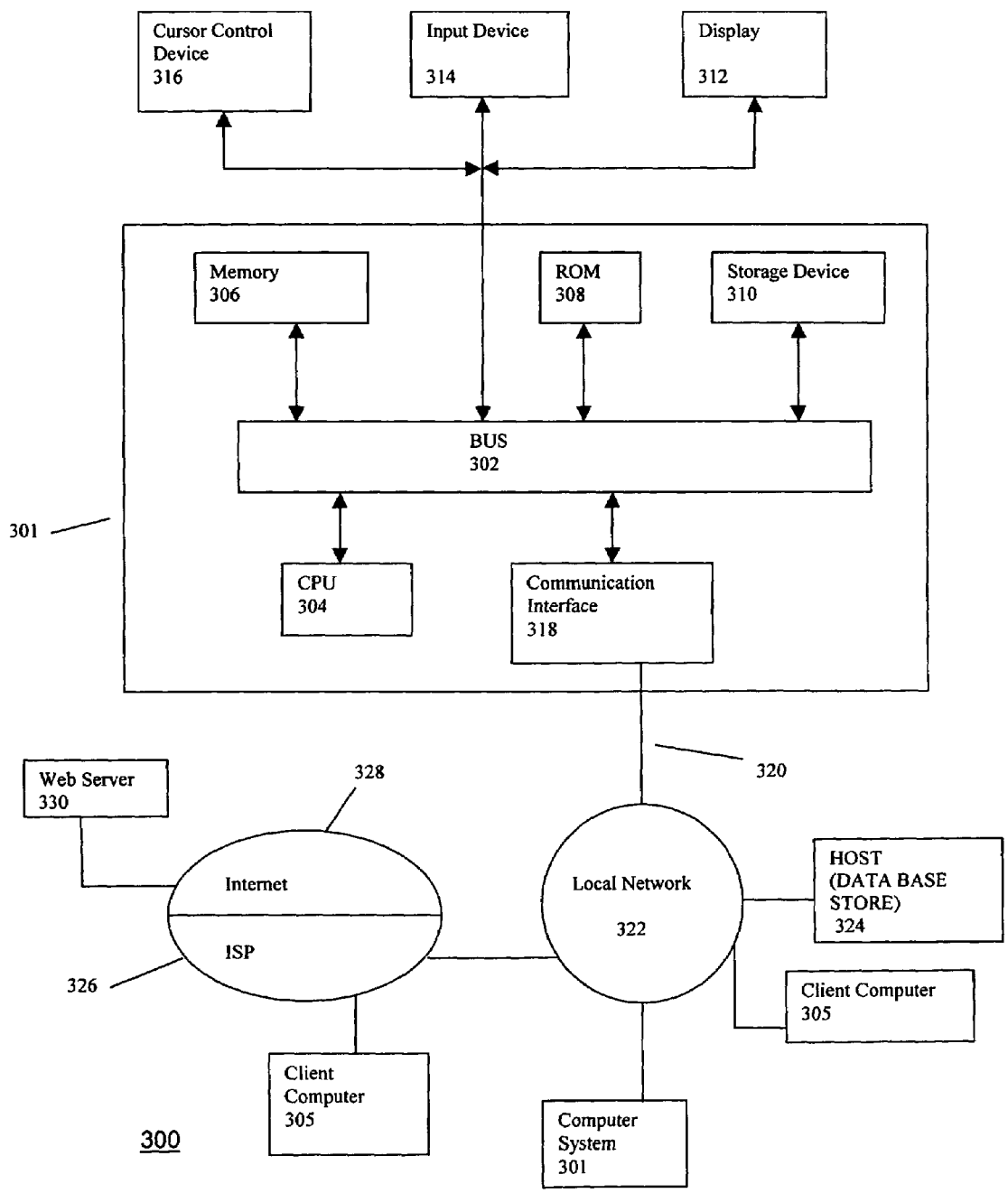
FIG. 11 shows a block diagram of an example architecture of an embodiment of another computer system in which the present invention can be implemented.

FIG. 11 shows a block diagram of an example architecture of an embodiment of a computer system 300 in which the present invention can be implemented. The computer system 300 includes one or more computer systems 301, wherein an LB module according to the present invention can be implemented in one or more of the computer systems 301. A computer system 301 (e.g., back-end tier server) includes a bus 302 or other communication mechanism for communicating information, and a processor 304 coupled with the bus 302 for processing information. The computer system 301 also includes a main memory 306, such as a random access memory (RAM) or other dynamic storage device, coupled to the bus 302. A portion of the memory 306 is used for storing information and instructions to be executed by the processor 304, and another portion of the memory 306 is used for storing temporary variables or other intermediate information during execution or instructions to be executed by the processor 304.

The computer system 301 further includes a read only memory (ROM) 308 or other static storage device coupled to the bus 302 for storing static information and instructions for the processor 304. A storage device 310, such as a magnetic disk or optical disk, is provided and coupled to the bus 302 for storing information and instructions. The bus 302 may contain, for example, thirty-two address lines for addressing the main memory 306 or video memory. The bus 302 can also include, for example, a 32-bit data bus for transferring data between and among the components, such as the CPU 304, the main memory 306 and the storage 310. Alternatively, multiplex data/address lines may be used instead of separate data and address lines.

In one embodiment, the CPU 304 comprises a microprocessor manufactured by Motorola® such as 680x0 processor, or a microprocessor manufactured by Intel®, such as the 80X86, or Pentium® processor, or a SPARC® microprocessor from Sun Microsystems®. However, any other suitable microprocessor or microcomputer may be utilized, based on the processing requirements for the computer system 301. The main memory 306 can comprise dynamic random access memory (DRAM). And video memory (not shown) can comprise a dual-ported video random access memory.

The computer system 301 can be coupled via the bus 302 to a display 312, such as a cathode ray tube (CRT), for displaying information to a computer user. An input device 314, including alphanumeric and other keys, is coupled to the bus 302 for communicating information and command selections to the processor 304. Another type or user input device comprises cursor control 316, such as a mousse, a trackball, or cursor direction keys for communicating direction information and command selections to the processor 304 and for controlling cursor movement on the display 312. This input device typically has two degrees of freedom in two axes, a first axis (e.g., x) and a second axis (e.g., y) that allows the device to specify positions in a plane.

A thin server appliance is usually accessed by a web browser remotely for the task of administration. The standard PC input/output devices such as monitor and keyboard are only used for maintenance and support by the manufacturer and not the end user.

According to one embodiment of the invention, the steps of the LB module described above, is performed by a computer system 301 in response to the processor 304 executing one or more sequences of one or more instructions contained in the main memory 306. Such instructions may be read into the main memory 306 from another computer-readable medium, such as the storage device 310 or floppy disks.

Execution of the sequences of instructions contained in the main memory 306 causes the processor 304 to perform the LB module steps described herein. One or more processors in a multi-processing arrangement may also be employed to execute the sequences of instructions contained in the main memory 306. In alternative embodiments, hare-wired circuitry may be used in place of or in combination with software instructions to implement the invention. Thus, embodiments of the invention are not limited to any specific combination of hardware circuitry and software.

The methods of the present invention (e.g., LB module) can be implement as computer instructions on a computer-readable-medium. The term "computer-readable medium" as used herein refers to any medium that participated in providing instructions to the processor 304 for execution. Such a medium may take many forms, including but not limited to, non-volatile media, volatile media, and transmission media. Non-volatile media includes, for example, optical or magnetic disks, such as the storage device 310. Volatile media includes dynamic memory, such as the main memory 306. Transmission media includes coaxial cables, copper wire and fiber optics, including the wires that comprise the bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 304 for execution. For example, the instructions may initially be carried on a magnetic disk of a remote computer. The remote computer can load the instructions into its dynamic memory and send the instructions over a telephone line using a modem. A modem local to the computer system 301 can receive the data on the telephone line and use an infrared transmitter to convert the data to an infrared signal. Although in general a modem can be used, an e-business can rely on a type of T1 LAN for communication. Also the web server 330 is usually co-located with DB and LB servers on e-business site.

An infrared detector coupled to the bus 302 can receive the data carried in the infrared signal and place the data on the bus 302. The bus 302 carries the data to the main memory 306, from which the processor 304 retrieves and executes the instructions. The instructions received from the main memory 306 may optionally be stored on the storage device 310 either before or after execution by the processor 304.

The computer system 301 also includes a communication interface 318 coupled to bus the 302. The communication interface 318 provides a two-way data communication coupling to a network link 320 that is connected to a local network 322. For example, the communication interface 318 may be an integrated services digital network (ISDN) card or a modern to provide a data communication connection to a corresponding type of telephone line, which can comprise part of the network link 320.

As another example, the communication interface 318 may be a local area network (LAN) card to provide a data communication connection to a compatible LAN. Wireless links may also be implemented. In any such implementation, the communication interface 318 sends and receives electrical electromagnetic or optical signals that carry digital data streams representing various types of information. Further, the communication interface 318 can comprise a USB/Tuner and the network link 320 may be an antenna or cable for connecting the computer system 301 to a cable provider, satellite provider or other terrestrial transmission system for receiving messages, data and program code from another source.

The network link 320 typically provides data communication through one or more networks to other data devices. For example, the network link 320 may provide a connection through the local network 322 to a host computer 324, to one or more client computers 305, or to data equipment operated by an Internet Service Provider (ISP) 326. The ISP 326 in turn provides data communication services through the 'Internet' 328.

The local network 322 and the Internet 328 both use electrical, electromagnetic or optical signals that carry digital data streams. The signals through the various networks and the signals on the network link 320 and through the communication interface 318, which carry the digital data to and from the computer system 301, are exemplary forms or carrier waves transporting the information. The computer system 301 can send/receive messages/data, including program code, through the network link 320 and the communication interface 318. The received code may be executed by the processor 304 as it is received, and/or stored in the storage device 310, or other non-volatile storage for later execution. In this manner, the computer systems 301 can obtain application code in the form of a carrier wave.

The example versions of the invention described herein are implemented as logical operations in computing systems 301. The logical operations of the present invention can be implemented as a sequence of steps executing on the computing system 301, and as interconnected machine modules within the computing system 301. The implementation is a matter of choice and can depend on performance of the a computer system 301 and/or network 300, implementing the invention. As such, the logical operations constituting said example versions of the invention are referred to for e.g. as operations, steps or modules.

The present invention has been described in considerable detail with reference to certain preferred versions thereof; however, other versions are possible. Therefore, the spirit and scope of the appended claims should not be limited to the description of the preferred versions contained herein.

What is claimed is:

1. A database load balancing method for back-end tier of a multi-tier computing environment including multiple database servers for at least one database, the database servers having a unified view of data in each database, comprising the steps of:
  receiving one or more database queries in the back-end tier of said multi-tier computing environment;
  establishing database specific connections to said multiple database servers in the back-end tier of said multi-tier computing environment for communicating with said database servers; and
  assigning new database queries to respective ones of said multiple database servers in the back-end tier of said multi-tier computing environment to balance respective loads of said multiple database servers wherein assigning each new database query comprises the steps of:
  (i) determining possible assignments of that new database query to one or more of said multiple database servers, each said possible assignment to one of said multiple database servers being based on a weighted combination of a number of database specific load balancing schemes to balance respective database query loads of said multiple database servers, further comprising the steps of dynamically changing a magnitude of one or more of weighting factors of said weighted combination; and
  (ii) assigning that new database query to one of said multiple database servers as a function of said possible assignments of that database query, to balance respective database query loads of said multiple database servers.

2. The method of claim 1 wherein each of said one or more database queries operates on the data records stored in said database.

3. The method of claim 1, wherein each database load balancing scheme identifies one of said multiple database servers for possible assignment of a new database query thereto to balance respective database query loads of said multiple database servers, based on database specific predetermined criteria.

4. The method of claim 1, further comprising the steps of maintaining a database query load history for each of a plurality of said multiple database servers, and at least one of said database load balancing schemes in step (ii) of assigning database queries includes the steps of identifying a database server in the back-end tier of the multi-tier computing environment for possible assignment of the new database query, wherein the identified database server has the lowest determined database query load among said multiple database servers based on the respective database query load histories of said plurality of database servers.

5. The method of claim 1, wherein the step of establishing said database specific connections further includes maintaining said connections to said database servers, and reusing existing connections for communication with said database servers.

6. The method of claim 1, wherein the step of establishing said database specific connections further includes establishing said connections using an interface to the multiple database servers.

7. The method of claim 1, wherein:
the step of establishing database specific connections further includes the steps of: establishing a first set of connections to a first subset of said multiple database servers using a first interface; and establishing a second set of connections to a second subset of said multiple database servers using a second interface; and
the step of assigning database queries further includes the steps of, for each of said subsets of the multiple database servers, assigning each of one or more database queries to respective ones of database servers in that subset of multiple database servers to balance respective database query loads of the database servers in that subset of the multiple database servers.

8. The method of claim 1, further comprising the steps of, for each new database query:
receiving that new database query from a requester and selecting one of said database servers for assigning the new database query thereto, in a first process, to balance respective database query loads of said multiple database servers; and
sending the new database query to the selected database server, in a second process, using one of said database specific connections to the selected database server;
wherein said processes cooperate in a specified sequence.

9. The method of claim 8, further comprising the steps of, after processing of the new database query in said database:
receiving response from the database in relation to said new database query via the selected database sever, in the second process, and communicating the response for delivery to the requester.

10. The method of claim 9, further comprising the steps of utilizing an inter-process communication protocol for cooperation among said processes.

11. The method of claim 9, wherein one or more of said processes comprise Java servlets.

12. The method of claim 11, wherein said communication protocol comprises inter-servlet communication protocol.

13. The method of claim 9, further comprising the steps of utilizing a single-thread or a multi-thread communication protocol for cooperation among said processes.

14. A database load balancing system for back-end tier of a multi-tier computing environment including multiple database servers for at least one database, the database servers having a unified view of data in each database, comprising:
at least one database load balancer in the back-end tier of said multi-tier computing environment for receiving new database queries and means for selecting one of said database servers for assigning each new database query to balance respective database query loads of said multiple database servers wherein means for selecting one of said database servers includes:
(i) means for determining possible assignments of each new database query to one or more of said multiple database servers, each possible assignment to one of said multiple database servers being based on a weighted combination of a number of database specific load balancing schemes, further comprising means for dynamically changing a magnitude of one or more weighting factors of said weighted combination; and
(ii) means for selecting one of said database servers for assigning the new database query thereto as a function of said possible assignments; and
at least one database server interface including connections for communication with said multiple database servers in the back-end tier of said multi-tier computing environment to send each new database query to one of said multiple database servers selected by the database load balancer.

15. The database load balancing system of claim 14, wherein each database load balancing scheme identifies one of said multiple database servers for possible assignment of a new database query thereto to balance respective database query loads of said multiple database servers, based on database specific predetermined criteria.

16. The database load balancing system of claim 14, further includes means for maintaining a database query load history for each of a plurality of said multiple data base servers, and at least one of said database load balancing schemes in step (ii) of selecting database servers identifies a database server for possible assignment of the new database query, wherein the identified database server has the lowest determined database query load among said multiple database servers based on the respective database query load histories of said plurality of database servers.

17. The database load balancing system of claim 14, wherein the database server interface includes database specific connection means for establishing said connections to said multiple database servers for communication with the multiple database servers.

18. The database load balancing system of claim 17, wherein the database server interface further includes means for maintaining said database specific connections to said database servers, and reusing existing database specific connections for communicating with said database servers.

19. The database load balancing system of claim 14, wherein:
the database load balancer comprises a first process means for receiving a new database query from a requester and selecting one of said database servers for assigning the new database query to balance respective database query loads of said multiple database servers; and
the database server interface further comprises a second process means for sending each new database query to one of said multiple database servers selected by the first process means;
wherein said first and second process means cooperate in a specified sequence.

20. The database load balancing system of claim 19, wherein the second process further receives a response from the database in relation to said new database query via the selected database sever after processing of the new database query in said database, and communicates the response for delivery to the requester.

21. The database load balancing system of claim 19, wherein each of the first and the second processes include means for inter-process communication for cooperation among said process means.

22. The database load balancing system of claim 21, wherein said inter-process communication comprises inter-servlet communication protocol.

23. The database load balancing system of claim 21, wherein said inter-process communication comprises a single-thread or a multi-thread communication protocol.

24. The database load balancing system of claim 19 wherein one or more of said processes comprise Java servlets.

25. The database load balancing system of claim 14 wherein the multi-tier computing environment comprises multiple computers interconnected via communication link means, at least one of said computers designated as a front end-tier computer, at least one of said computers designated as a middle tier computer generating said database queries, at least one of said computers designated as a load balancer computer, and at least one of said computers designated as a back-end tier computer including said database servers, the middle tier computer connected between the front-end and back-end tier computers, and the load balancing system connected between the middle tier computer and the back-end tier computers.

26. The database load balancing system of claim 14, further comprising:
   at least two database load balancers, each load balancer being for receiving new database queries and for each new database query selecting one of said database servers for assigning that new database query, to balance respective database query loads of said multiple database servers; and
   at least two database server interfaces, each database server interface corresponding to a database load balancer, each database server interface including connections to said multiple database servers for sending each new database query to one of said multiple database servers selected by a corresponding database load balancer;
   means for selecting one of said database load balancers and corresponding interface that are functioning to receive new database queries.

27. The database load balancing system of claim 26, wherein the means for selecting one of said database load balancers includes means for monitoring functioning status of each load balancer and for routing new database queries to one of said database load balancers that is functioning.

28. A computer program product for use with a database load balancing system in back-end tier of a multi-tier computing environment including multiple database servers for a least one database, the database servers having a unified view of the data in each database, the computer program product comprising:
   a computer readable medium;
   means, provided on the computer-readable medium, for establishing database specific connections to said multiple database servers in the back-end tier of said multi-tier computing environment for communicating with said database servers; and
   means, provided on the computer-readable medium, for assigning new database queries to respective ones of said multiple database servers in the back-end tier of said multi-tier computing environment to balance respective database query loads of said multiple database servers wherein assigning each new database query comprises:
   (i) means for determining possible assignments of that new database query to one or more of said multiple database servers, each said possible assignment to one of said multiple database servers being based on a weighted combination of a number of database specific load balancing schemes to balance respective database query loads of said multiple database servers, further comprising means for dynamically changing the magnitude of one or more weighting factors of said weighted combination; and
   (ii) means for assigning that new database query to one of said multiple database servers as a function of said possible assignments of that new database query, to balance respective database query loads of said multiple database servers.

29. The computer program product of claim 28, wherein each database load balancing scheme identifies one of said multiple database servers for possible assignment of a new database query thereto to balance respective database query loads of said multiple database servers, based on database specific predetermined criteria.

30. The computer program product of claim 28, further comprising means, provided on the computer-readable medium, for maintaining a database query load history for each of a plurality of said multiple data base servers, and wherein at least one of said load balancing schemes in step (ii) of selecting database servers identifies a database server for possible assignment of the new database query, wherein the identified database server has the lowest determined database query load among said multiple database servers based on the respective database query load histories of said plurality of database servers.

31. The computer program product of claim 28, wherein the means for establishing connections further includes means for maintaining said database specific connections to said database servers, and reusing existing database connections for communication with said database servers.

32. The computer program product of claim 28, wherein the means for establishing database specific connections further includes means for establishing said connections using an interface to the database servers.

33. The computer program product of claim 28, further comprising:
   first process means, provided on the computer readable medium, for receiving each new database query from a requester and selecting one of said database servers for assigning the new database query thereto, to balance respective database query loads of said multiple database servers; and
   second process means, provided on the computer readable medium, for sending a new database query to a selected database server, using one of said database specific connections to the selected database server;
   wherein said first and second process means cooperate in a specified sequence.

34. The computer program product of claim 33, wherein the second process means further includes means for, after processing of the new database query in said database, receiving response from the database in relation to said new database query via the selected database server, and communicating the response for delivery to the requester.

35. The computer program product of claim 33, wherein one or more of said process means comprise Java servlets.

36. The computer program product of claim 35, wherein one or more of said process means comprises inter-servlet communication protocol.

37. The computer program product of claim 36 wherein said communication protocol comprises a single-thread or a multi-thread communication protocol.

38. The computer program product of claim 33, further comprising means, provided on the computer-readable medium for inter-process communication for cooperation among said process means.

39. The computer program product of claim 33, further includes on the computer-readable medium Java Runtime Environment (JRE) and Apache Tomcat servlet container software systems.

* * * * *